US012699402B2

(12) United States Patent
Watanabe et al.

(10) Patent No.: US 12,699,402 B2
(45) Date of Patent: *Aug. 4, 2026

(54) AUTONOMOUS MOVING SYSTEM, AUTONOMOUS MOVING METHOD, AND STORAGE MEDIUM

(71) Applicant: TOYOTA JIDOSHA KABUSHIKI KAISHA, Toyota (JP)

(72) Inventors: Yuta Watanabe, Toyota (JP); Shiro Oda, Anjo (JP); Takeshi Matsui, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

This patent is subject to a terminal disclaimer.

(21) Appl. No.: 18/599,354

(22) Filed: Mar. 8, 2024

(65) Prior Publication Data

US 2024/0353860 A1      Oct. 24, 2024

(30) Foreign Application Priority Data

Apr. 18, 2023    (JP) ................................. 2023-067517

(51) Int. Cl.
*G05D 1/622*          (2024.01)
*G05D 107/60*        (2024.01)
*G05D 107/70*        (2024.01)

(52) U.S. Cl.
CPC ......... *G05D 1/637* (2024.01); *G05D 2107/63* (2024.01); *G05D 2107/65* (2024.01); *G05D 2107/70* (2024.01)

(58) Field of Classification Search
CPC ............... G05D 1/637; G05D 2107/63; G05D 2107/65; G05D 2107/70; G05D 1/249;
(Continued)

(56) References Cited

U.S. PATENT DOCUMENTS 11,355,011 B1 *   6/2022   Khmelev ........... B60W 60/0011
2013/0034286 A1 *  2/2013   Vija .......................... G06T 7/32
                                                                   382/131

(Continued)

FOREIGN PATENT DOCUMENTS

JP          2016-95703 A       5/2016
JP          2021-086217 A      6/2021
(Continued)

OTHER PUBLICATIONS

Jul. 9, 2025 Office Action issued in U.S. Appl. No. 18/594,038.

*Primary Examiner* — Dale W Hilgendorf
*Assistant Examiner* — Frank T Glenn, III
(74) *Attorney, Agent, or Firm* — Oliff PLC

(57)          ABSTRACT

An autonomous moving system according to the present disclosure includes a control unit executing control of movement of an autonomous moving body, including collision control, a setting unit setting a predetermined defense space around the autonomous moving body, for executing the collision control, and a classifying unit classifying an obstruction detected by a detecting unit installed in the autonomous moving body, and an obstruction detected by a detecting unit installed in a facility space through which the autonomous moving body moves. The setting unit changes a range of the defense space to a first range based on a result of the classifying unit classifying the obstruction detected by one of the detecting units, and changes the range of the defense space from the first range to a second range based on a result of the classifying unit classifying the obstruction detected by at least another of the detecting units.

14 Claims, 11 Drawing Sheets

(58) Field of Classification Search
CPC .......... G05D 2101/20; G05D 2105/28; G05D 2109/10; G05D 2111/10; G05D 1/43; G05D 1/622; G06V 20/52; G06V 20/58
See application file for complete search history.

(56) References Cited

U.S. PATENT DOCUMENTS

| | | |
|---|---|---|
| 2014/0031981 A1 | 1/2014 | Fernando et al. |
| 2015/0234383 A1* | 8/2015 | Tanigawa ............. G05D 1/0246 701/28 |
| 2016/0125268 A1* | 5/2016 | Ebiyama ................ G06V 20/52 382/218 |
| 2017/0315559 A1 | 11/2017 | Etoh |
| 2019/0113916 A1* | 4/2019 | Guo ..................... A61B 5/6893 |
| 2019/0329729 A1* | 10/2019 | Hilligardt ............... B60R 21/34 |
| 2020/0223431 A1* | 7/2020 | Zass ..................... B60W 30/09 |
| 2021/0042592 A1* | 2/2021 | Hashimoto .......... G06V 10/764 |
| 2021/0157326 A1* | 5/2021 | Takai ................... G05D 1/0255 |
| 2021/0260764 A1* | 8/2021 | Paschall, II ............ B25J 9/1666 |
| 2021/0346557 A1* | 11/2021 | Brooks ...................... A61L 2/24 |
| 2022/0206503 A1 | 6/2022 | Taira et al. |
| 2023/0020135 A1* | 1/2023 | Ferguson ................ G08G 5/56 |
| 2023/0066510 A1 | 3/2023 | Yasunaga et al. |
| 2023/0152811 A1 | 5/2023 | Watanabe et al. |

FOREIGN PATENT DOCUMENTS

| | | |
|---|---|---|
| JP | 2022-94178 A | 6/2022 |
| JP | 2023-36418 A | 3/2023 |
| JP | 2023-072145 A | 5/2023 |
| WO | 2013/046563 A1 | 4/2013 |

* cited by examiner

1a

AUTONOMOUS MOVING BODY — 100

CONTROL UNIT — 111

STORAGE UNIT — 112

COMMUNICATION UNIT — 113

SETTING UNIT — 114

DETECTING UNIT

SENSOR GROUP, CAMERAS — 115

CLASSIFYING UNIT — 116

DRIVE UNIT — 117

DISPLAY UNIT — 118

OPERATION ACCEPTING UNIT — 119

AUTONOMOUS MOVING SYSTEM, AUTONOMOUS MOVING METHOD, AND STORAGE MEDIUM

CROSS-REFERENCE TO RELATED APPLICATION

This application claims priority to Japanese Patent Application No. 2023-067517 filed on Apr. 18, 2023, incorporated herein by reference in its entirety.

BACKGROUND

1. Technical Field

The present disclosure relates to an autonomous moving system, an autonomous moving method, and a storage medium.

2. Description of Related Art

Japanese Unexamined Patent Application Publication No. 2021-086217 (JP 2021-086217 A) discloses an autonomous moving system including an autonomous moving body. The autonomous moving body disclosed in JP 2021-086217 A is equipped with a sensor that detects obstructions in a vicinity of the autonomous moving body, and sets an entry-prohibited space and an entry-restricted space. When the sensor detects an obstruction entering the entry-restricted space, the autonomous moving body reduces the movement speed thereof, executes an avoidance action, or the like.

SUMMARY

Although JP 2021-086217 A describes that when an autonomous moving body starts moving, notification is given to the surroundings by audio or LED, but does not describe an action to avoid obstructions when starting to move. Even when an obstruction is present near the autonomous moving body, the autonomous moving body will start to move as long as the obstruction is outside the entry-prohibited space of the autonomous moving body. Accordingly, when an obstruction located near the entry-prohibited space moves immediately after the autonomous moving body starts to move, there is a possibility that it will collide with the autonomous moving body.

Also, when an obstruction is present in the entry-prohibited space of the autonomous moving body is stopped, the autonomous moving body may not be able to start to move until the obstruction moves away. In order for the autonomous moving body to start moving without mechanical interference with obstructions, it is desirable to comprehend the situation in the vicinity of the autonomous moving body, such as the movement of obstructions, and to change actions, such as starting to move and stopping, in accordance with the situation.

The present disclosure provides an autonomous moving system, an autonomous moving method, and a storage medium, in which actions can be changed depending on the situation.

An autonomous moving system according to an aspect of the present disclosure, including an autonomous moving body that moves autonomously, includes a control unit that executes control of movement of the autonomous moving body, including collision control of at least one of control to avoid a collision between the autonomous moving body and an obstruction and control to mitigate damage upon a collision, a setting unit that sets a predetermined defense space around the autonomous moving body, for executing the collision control by the control unit, and a classifying unit that classifies the obstruction detected by a first detecting unit that is installed in the autonomous moving body and that detects obstructions in a vicinity of the autonomous moving body, and the obstruction that is detected by a second detecting unit installed in a facility space through which the autonomous moving body moves and that detects obstructions in the vicinity of the autonomous moving body. The setting unit changes a range of the defense space to a first range based on a result of the classifying unit classifying the obstruction detected by one of the first detecting unit and the second detecting unit, and changes the range of the defense space from the first range to a second range based on a result of the classifying unit classifying the obstruction detected by at least another of the first detecting unit and the second detecting unit, and the control unit executes control of movement of the autonomous moving body including the collision control in at least one of when the obstruction is inside the defense space and when the obstruction is predicted to enter inside the defense space.

In the above autonomous moving system, the movement of the autonomous moving body may include the autonomous moving body starting to move, and the control unit may stop the autonomous moving body from starting to move, based on the obstruction classified by the classifying unit.

In the above autonomous moving system, the control unit may stop movement of the autonomous moving body when the obstruction is present in the first range and the second range.

In the above autonomous moving system, the classifying unit may classify the obstruction detected by the detecting units, by using an algorithm that is subjected to machine learning using the obstruction as training data.

In the above autonomous moving system, when the classifying unit classifies the obstruction as a wall, the setting unit may exclude a portion of the wall of the defense space from the defense space.

In the above autonomous moving system, when the classifying unit classifies the obstruction as a wheelchair, the setting unit may reduce a width of the defense space on a wheelchair side, and increase the width of the defense space on an opposite side from the wheelchair.

In the above autonomous moving system, when the classifying unit classifies the obstruction as the wheelchair in a state of being stopped for a predetermined period of time, the setting unit may exclude a portion of the wheelchair of the defense space from the defense space.

In the above autonomous moving system, when the classifying unit classifies the obstruction as the wheelchair that a person is riding, the control unit may cause the autonomous moving body to move away from the wheelchair.

In the above autonomous moving system, when the classifying unit classifies the obstruction as a stretcher, the setting unit may enlarge the defense space, and the control unit may cause the autonomous moving body to move out of a space through which the stretcher passes, in a direction in which the stretcher advances.

The above autonomous moving system may further include a storage unit storing map information of the facility space through which the autonomous moving body moves, and the classifying unit may classify the obstruction that is detected, based on the map information acquired from the storage unit.

In the above autonomous moving system, the first detecting unit may be configured to detect obstructions in the vicinity of the autonomous moving body in a range that is wider than the defense space.

In the above autonomous moving system, the facility space through which the autonomous moving body moves may be inside a hospital, a business office, a factory, a warehouse, or a commercial facility.

An autonomous moving method according to an aspect of the present disclosure is an autonomous moving method for an autonomous moving body that moves autonomously, including setting a predetermined defense space around the autonomous moving body, for executing collision control of at least one of control to avoid a collision between the autonomous moving body and an obstruction and control to mitigate damage upon a collision, classifying an obstruction in a vicinity of the autonomous moving body that is detected by a first detecting unit installed in the autonomous moving body, and the obstruction in the vicinity of the autonomous moving body that is detected by a second detecting unit installed in a facility space through which the autonomous moving body moves, changing a range of the defense space to a first range based on a result of classification of the obstruction, detected by one of the first detecting unit and the second detecting unit, changing the range of the defense space from the first range to a second range based on a result of classifying the obstruction detected by at least another of the first detecting unit and the second detecting unit, and executing control of movement of the autonomous moving body including the collision control in at least one of when the obstruction is inside the defense space and when the obstruction is predicted to enter inside the defense space.

A storage medium according to an aspect of the present disclosure stores instructions that are executable by one or more processors and that cause the one or more processors to perform functions. The functions include setting a predetermined defense space around the autonomous moving body, for executing collision control of at least one of control to avoid a collision between the autonomous moving body and an obstruction and control to mitigate damage upon a collision, classifying an obstruction in a vicinity of the autonomous moving body that is detected by a first detecting unit installed in the autonomous moving body, and the obstruction in the vicinity of the autonomous moving body that is detected by a second detecting unit installed in a facility space through which the autonomous moving body moves, changing a range of the defense space to a first range based on a result of classification of the obstruction, detected by one of the first detecting unit and the second detecting unit, changing the range of the defense space from the first range to a second range based on a result of classifying the obstruction detected by at least another of the first detecting unit and the second detecting unit, and executing control of movement of the autonomous moving body including the collision control in at least one of when the obstruction is inside the defense space and when the obstruction is predicted to enter inside the defense space.

According to the present disclosure, an autonomous moving system, in which actions can be changed depending on the situation, can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A specific configuration of embodiments will be described below with reference to the drawings. The following description illustrates preferred embodiments of the present disclosure, and the scope of the present disclosure is not limited to the following embodiments. Also, all the configurations described in the present embodiment are not necessarily essential as means for solving the problem. In order to clarify description, omissions and simplification have been made as appropriate in the following description and the drawings. In each drawing, the same elements are denoted by the same signs, and redundant description will be omitted as necessary.

First Embodiment

An autonomous moving system according to a first embodiment will be described. In the present embodiment, the autonomous moving system may be replaced with an autonomous moving body, and the autonomous moving body may be replaced with the autonomous moving system. Also, the autonomous moving system according to the present embodiment may include the autonomous moving body.

Figure 1:
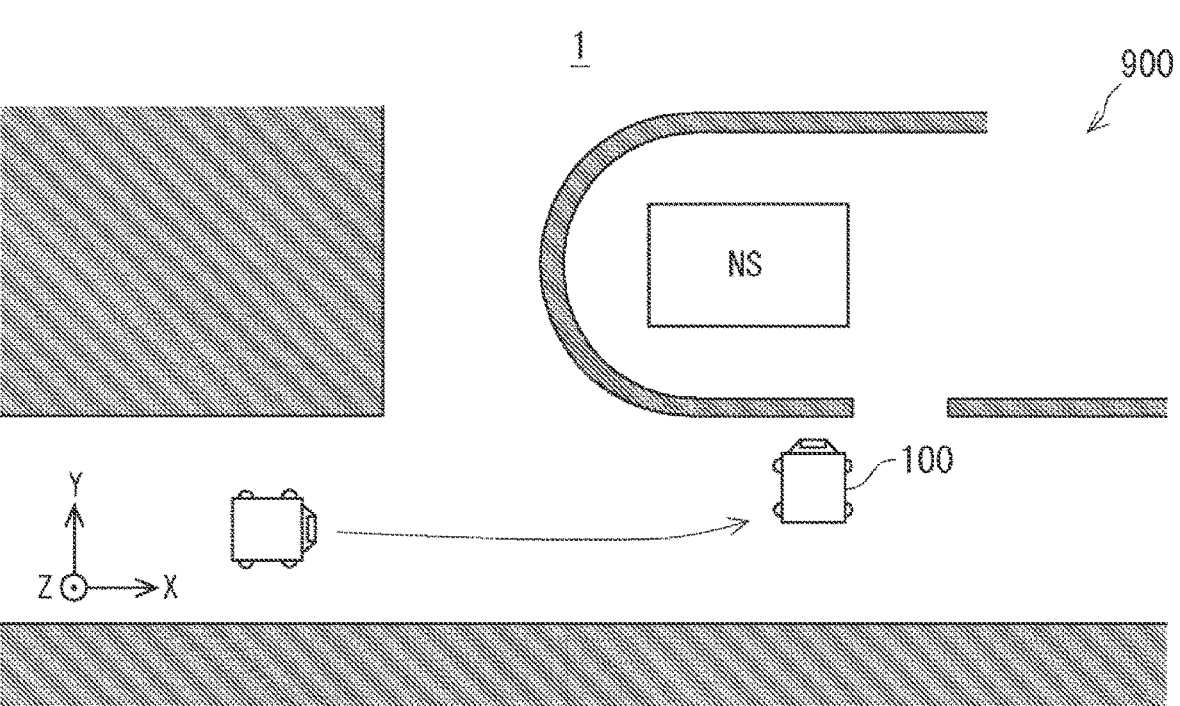
FIG. 1 is a schematic diagram exemplifying an autonomous moving body in an autonomous moving system according to a first embodiment.
Figure 2:
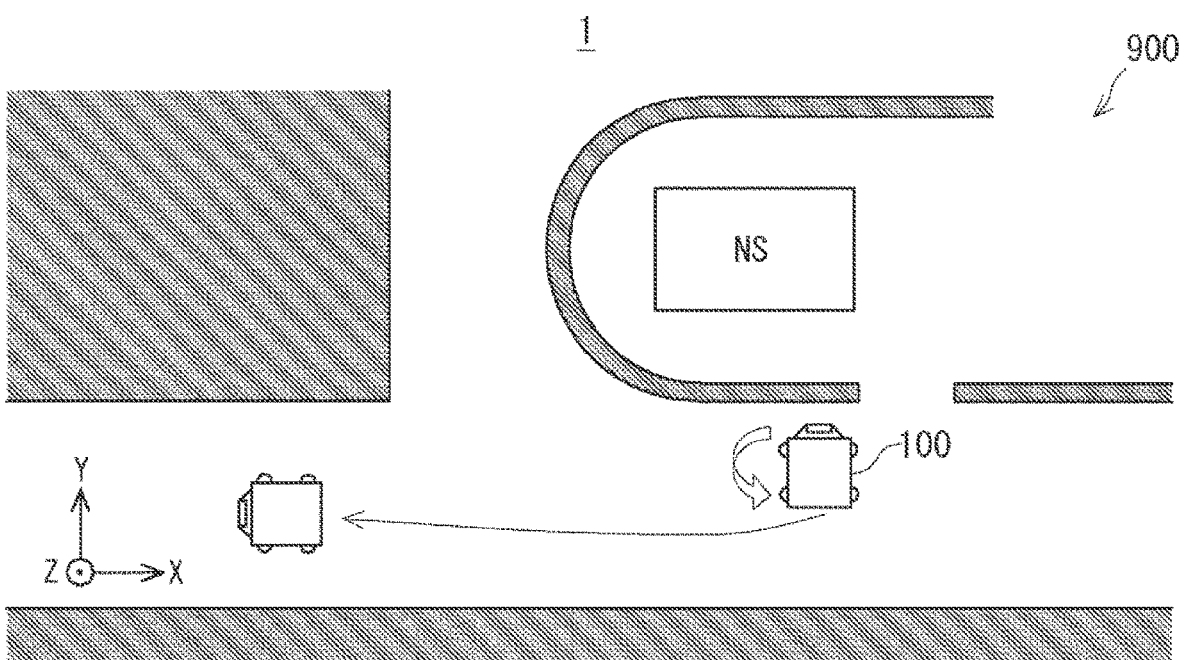
FIG. 2 is a schematic diagram exemplifying the autonomous moving body in the autonomous moving system according to the first embodiment.

FIGS. 1 and 2 are schematic diagrams exemplifying the autonomous moving body in the autonomous moving system according to the first embodiment. As illustrated in FIG. 1, the autonomous moving system 1 includes an autonomous moving body 100 that moves autonomously, and is installed in a predetermined facility space 900. The facility space 900 is, for example, a space within a hospital. Note that the facility space 900 is not limited to a space in a hospital, and may be a space in a rehabilitation center, a nursing care facility, or a residential facility for the elderly, as long as the autonomous moving system 1 is installed in the space. Furthermore, the facility space 900 may be a space such as a business office, a factory, or a warehouse, or a space within a commercial facility such as a shopping mall or the like. The autonomous moving system 1 may be installed not only indoors but also outdoors, such as at a theme park or a tourist spot.

Here, for convenience of description of the autonomous moving system 1, an XYZ orthogonal coordinate axis system will be introduced. For example, a floor surface of the facility space 900 in which the autonomous moving body 100 moves is defined as an XY plane, and a direction perpendicular to the floor surface is defined as a Z-axis direction.

As illustrated in FIGS. 1 and 2, the autonomous moving body 100 moves in the facility space 900. The autonomous moving body 100 is, for example, a transporting robot that executes transporting of a transport item as a task. The autonomous moving body 100 may be an autonomously-traveling vehicle (Automatic Guided Vehicle) that is driven by wheels and travels autonomously. Note that the autonomous moving body 100 may also include moving bodies that are hovercraft type, linear motor, and so forth, that can move other than by being driven by wheels. Also, the autonomous moving body 100 may include not only performing autonomous movement control by the autonomous moving body 100 itself, but also cases in which autonomous traveling is controlled by a control signal or the like that is transmitted from a management device such as an external server or the like.

A user stores a transport item in the autonomous moving body 100 and commissions transportation thereof. The autonomous moving body 100 autonomously moves to a destination that is set, thereby transporting the transport item. When the facility space 900 is a hospital, as illustrated in FIG. 1, the autonomous moving body 100 delivers transport items from a nurses station NS of one clinical department to a nurses station NS of another clinical department. Alternatively, the autonomous moving body 100 delivers transport items from a storeroom for equipment or medical instruments to a nurses station NS of a clinical department. Thereafter, as illustrated in FIG. 2, the autonomous moving body 100 pivots at the nurses station NS and moves from the nurses station NS to another transportation destination. For example, the autonomous moving body 100 delivers medicine that is dispensed to a clinical department or patient at which usage thereof is scheduled. The autonomous moving body 100 may transport equipment, consumables, medical instruments, and so forth, between a plurality of clinical departments.

Examples of the transport items include medicines, consumables such as bandages, specimens, testing instruments, medical instruments, hospital food, equipment such as stationery, and so forth. Examples of the medical equipment include sphygmomanometers, blood transfusion pumps, syringe pumps, foot pumps, nurse call buttons, bed leaving sensors, low-pressure continuous suction devices, electrocardiogram monitors, medication infusion controllers, enteral feeding pumps, ventilators, cuff pressure gauges, touch sensors, inhalers, nebulizers, pulse oximeters, artificial resuscitators, aseptic isolators, ultrasound devices, and so forth. Meals, such as hospital food, food for a special diet a patient follows to prepare for a test, and so forth, may be transported. The autonomous moving body 100 may further transport used equipment, used tableware, and so forth. When the transportation destination is on a different floor, the autonomous moving body 100 may move using an elevator or the like.

Figure 3:
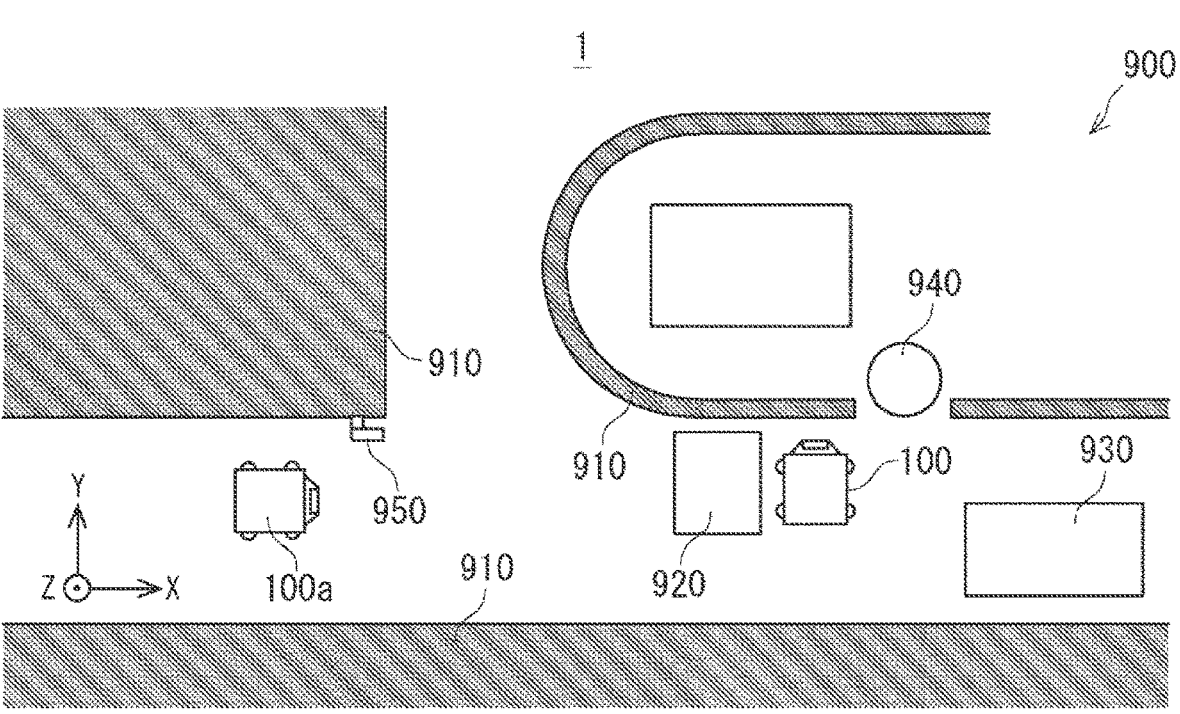
FIG. 3 is a schematic diagram exemplifying a facility space in which the autonomous moving system according to the first embodiment is installed.

FIG. 3 is a schematic diagram exemplifying the facility space 900 in which the autonomous moving system 1 according to the first embodiment is installed. As illustrated in FIG. 3, the facility space 900 may have walls 910. The autonomous moving body 100 may move in a space surrounded by the walls 910. A wheelchair 920 and a stretcher 930 may be placed in the facility space 900. The wheelchair 920 and the stretcher 930 may be moved through the facility space 900, or may be fixed at predetermined positions in the facility space 900. A person 940 may be present in the facility space 900. The person 940 may move through the facility space 900.

A detecting unit 950 including one or a plurality of facility cameras, one or a plurality of facility sensors, and so forth, may be installed in the facility space 900. A plurality of autonomous moving bodies 100 and 100a may move through the facility space 900. Although two autonomous moving bodies 100 and 100a are illustrated in FIG. 3, three or more autonomous moving bodies 100, 100a, and so on, may move through the facility space 900. The facility space 900 includes the walls 910, the wheelchair 920, the stretcher 930, and the person 940, which are obstructions to the movement of the autonomous moving body 100. The detecting unit 950 acquires information such as images, videos, and so forth, regarding obstructions in the vicinity of the autonomous moving body 100 in the facility space 900. Thus, the detecting unit 950 detects obstructions in the vicinity of the autonomous moving body 100.

Figure 4:
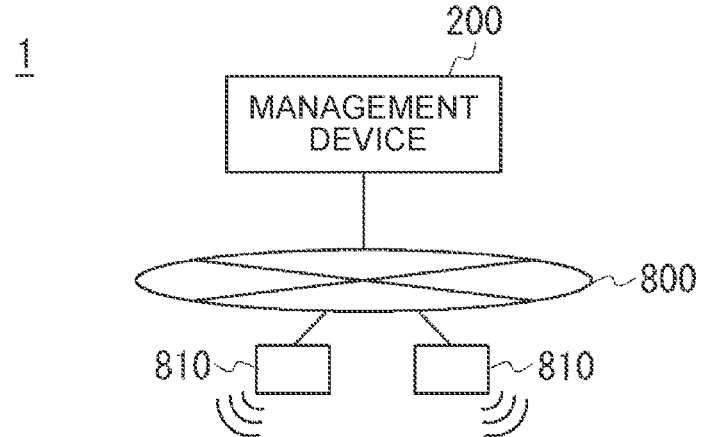
FIG. 4 is a configuration diagram exemplifying the autonomous moving body and a management device in the autonomous moving system according to the first embodiment.
Figure 4:
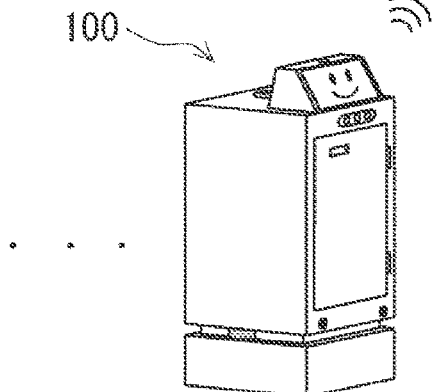
Figure 4:
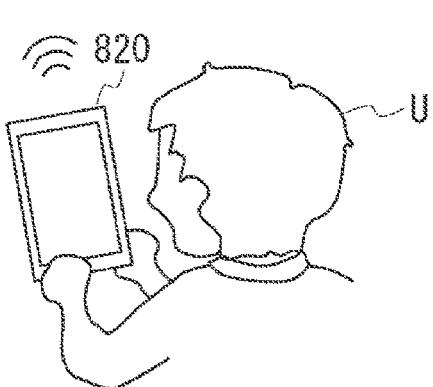

FIG. 4 is a configuration diagram exemplifying the autonomous moving system 1 according to the first embodiment. As illustrated in FIG. 4, the autonomous moving system 1 may include the autonomous moving body 100, a management device 200, a network 800, communication units 810, and a user terminal 820. The autonomous moving system 1 may include a plurality of the user terminals 820, and as described above, may include the autonomous moving bodies 100.

A user U can commission the autonomous moving body 100 to perform transportation of transport items, using the user terminal 820. For example, the user terminal 820 is a tablet computer, a smartphone, or the like. It is sufficient for the user terminal 820 to be an information processing device capable of wireless or wired communication.

In the present embodiment, the autonomous moving body 100 and the user terminal 820 are connected to the management device 200 via the network 800. The autonomous moving body 100 and the user terminal 820 are connected to the network 800 via the communication units 810. The network 800 is a wired or wireless local area network (LAN)

or wide area network (WAN). The management device 200 is further connected to the network 800 by wire, or wirelessly. The communication units 810 are wireless LAN units, for example, installed in their respective environments. The communication units 810 may be general-purpose communication devices such as a WiFi router or the like, for example.

Various types of signals, transmitted from the user terminal 820 of the user U, are first sent to the management device 200 via the network 800, and are transferred from the management device 200 to the autonomous moving bodies 100 that are relevant. In the same way, various types of signals, transmitted from the autonomous moving bodies 100, are first sent to the management device 200 via the network 800, and are transferred from the management device 200 to the user terminal 820 that is relevant. The management device 200 may be a server that is connected to each piece of equipment, and that collects data from each piece of equipment. Also, the management device 200 is not limited to being a physically singular device, and may have a plurality of devices performing distributed processing. Further, the management device 200 may be deployed distributed in edge devices of the autonomous moving bodies 100 or the like. For example, part or all of the autonomous moving system 1 may be implemented in the autonomous moving bodies 100.

The user terminals 820 and the autonomous moving bodies 100 may exchange signals without going through the management device 200. For example, the user terminals 820 and the autonomous moving bodies 100 may directly exchange signals by wireless communication. Alternatively, the user terminals 820 and the autonomous moving bodies 100 may exchange signals via the communication units 810.

Figure 5:
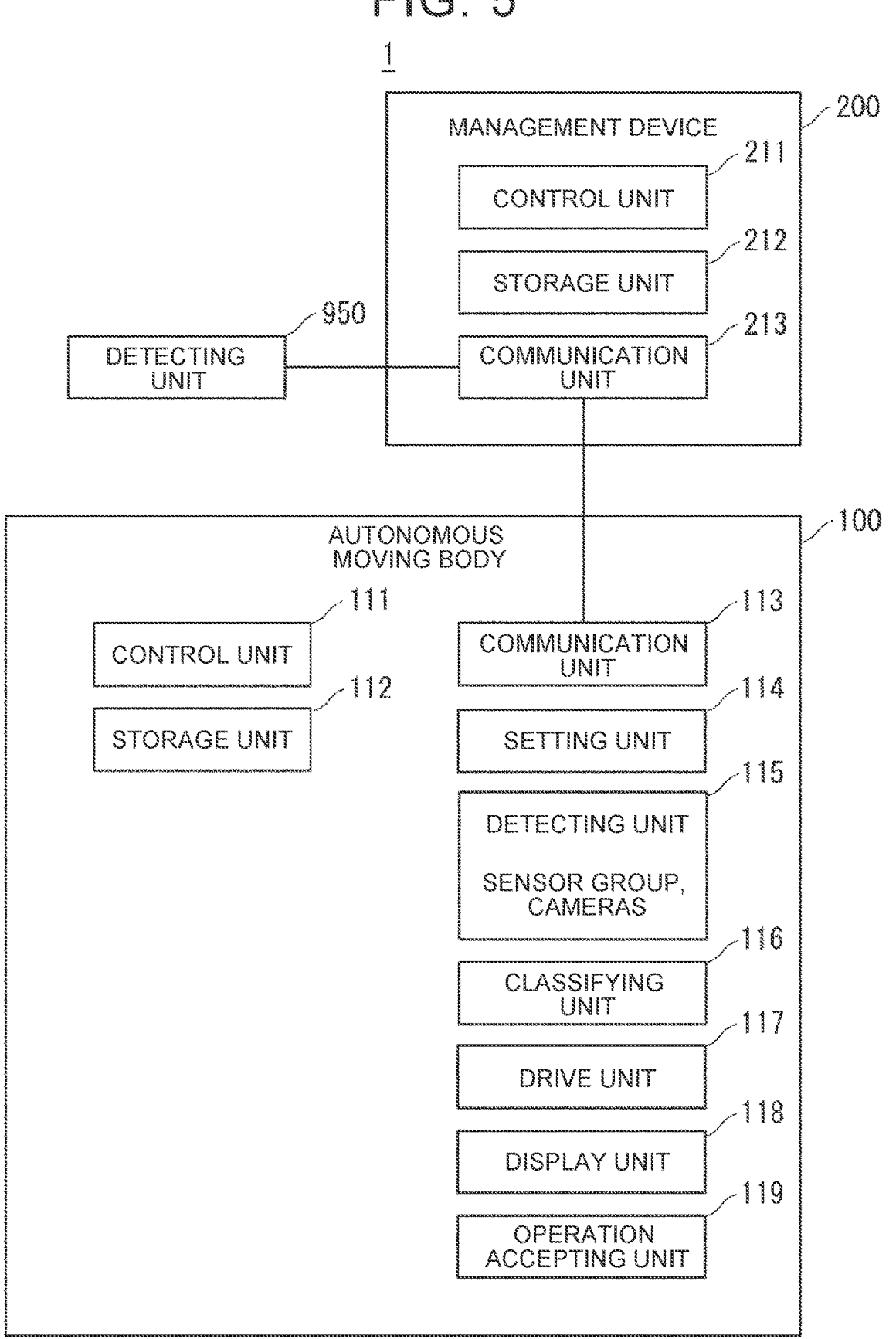
FIG. 5 is a block diagram exemplifying the autonomous moving body and the management device in the autonomous moving system according to the first embodiment.
Figure 6:
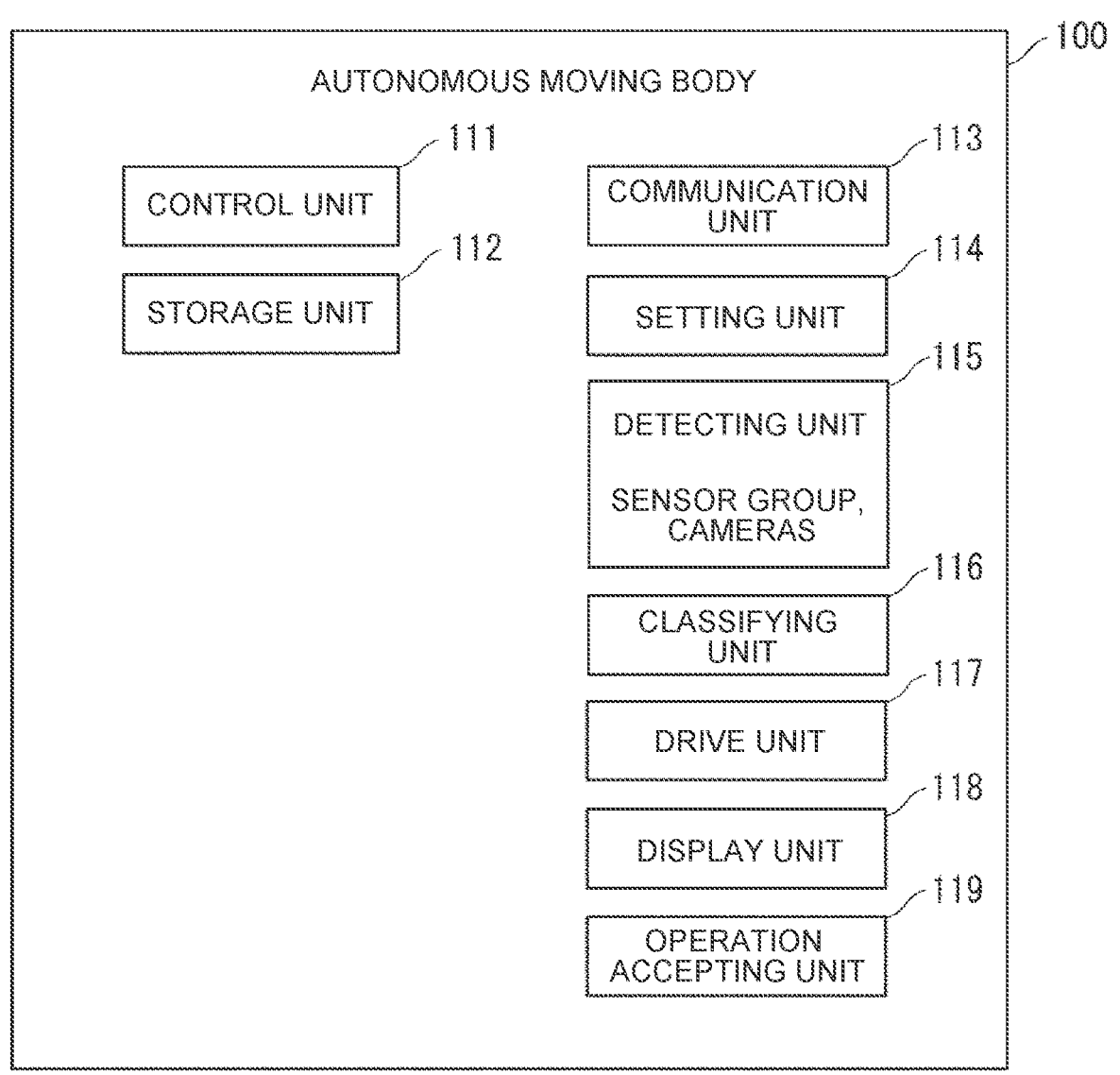
FIG. 6 is a block diagram exemplifying the autonomous moving body in an autonomous moving system according to another example of the first embodiment.

FIG. 5 is a block diagram exemplifying the autonomous moving body 100 and the management device 200 in the autonomous moving system 1 according to the first embodiment. FIG. 6 is a block diagram exemplifying the autonomous moving body 100 in an autonomous moving system 1a according to another example of the first embodiment. As illustrated in FIG. 5, the autonomous moving system 1 may include the autonomous moving body 100 and the management device 200, or as illustrated in FIG. 6, the autonomous moving system 1a may include the autonomous moving body 100 alone.

As illustrated in FIGS. 5 and 6, the autonomous moving body 100 includes a control unit 111, a storage unit 112, a communication unit 113, a setting unit 114, a detecting unit 115, a classifying unit 116, a drive unit 117, a display unit 118, and an operation accepting unit 119. The management device 200 includes a control unit 211, a storage unit 212, and a communication unit 213. Note that FIGS. 5 and 6 illustrate representative processing blocks included in the autonomous moving body 100 and the management device 200. The autonomous moving body 100 and the management device 200 may include other processing blocks that are not illustrated.

The control unit 111 controls the autonomous moving body 100. For example, the control unit 111 controls movement of the autonomous moving body 100. The control unit 111 controls the movement of the autonomous moving body 100, for example, in order to reduce the risk of colliding with an obstruction and to mitigate damage upon a collision. Specifically, the control unit 111 causes the autonomous moving body 100 to move so as to avoid obstructions and not collide therewith. Also, the control unit 111 may control the autonomous moving body 100 to decelerate or to stop. Also, the control unit 111 may control the autonomous moving body 100 to move in the same direction as another autonomous moving body 100. At least one of control to avoid collision with obstructions and control to mitigate damage at the time of a collision is referred to as "collision control". The control unit 111 executes control of movement of the autonomous moving body 100, including collision control. Movement of the autonomous moving body 100 may include the autonomous moving body 100 starting to move.

The control unit 111 has a function of being capable of executing a program, for example, as with a central processing unit (CPU) of a computer or the like. Functions of each part of the autonomous moving body 100 can also be realized by a program.

The storage unit 112 stores various types of data for movement of the autonomous moving body 100. The storage unit 112 stores, for example, data input by the user U, such as a transportation destination of a transport item, or the like. The communication unit 113 communicates with the user terminal 820 and the management device 200, and acquires various types of data from the user terminal 820 and the management device 200.

Figure 7:
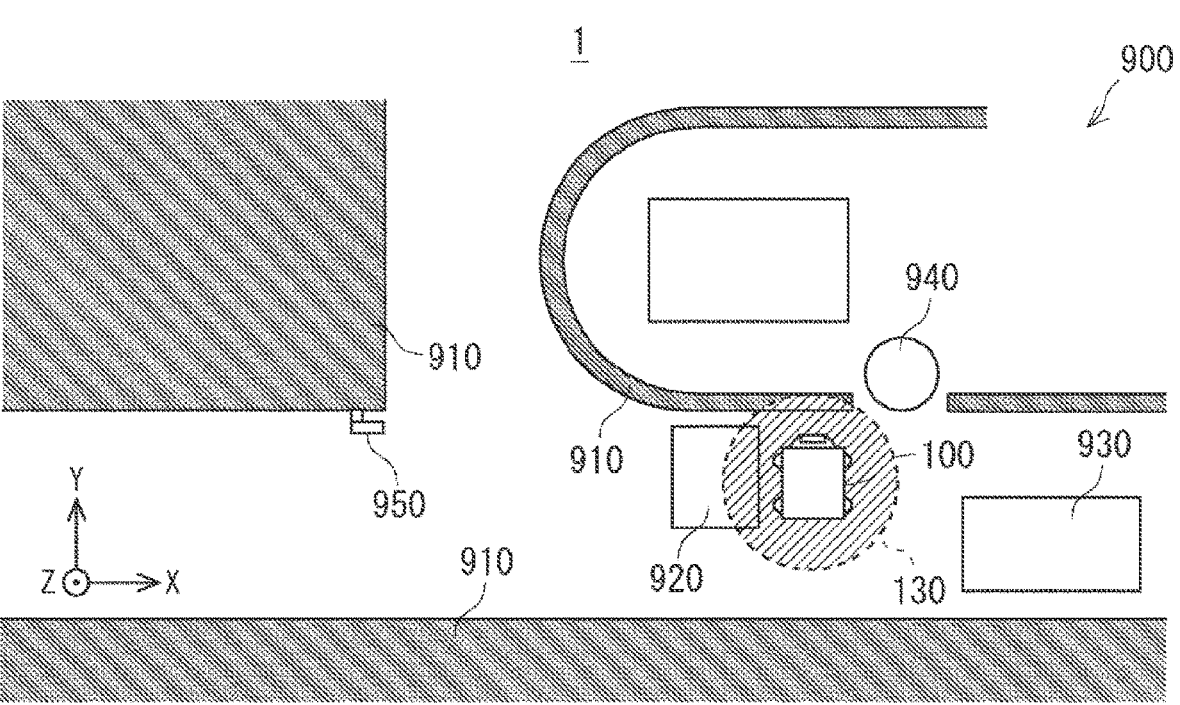
FIG. 7 is a diagram exemplifying a defense space set by a setting unit of the autonomous moving system according to the first embodiment.
Figure 8:
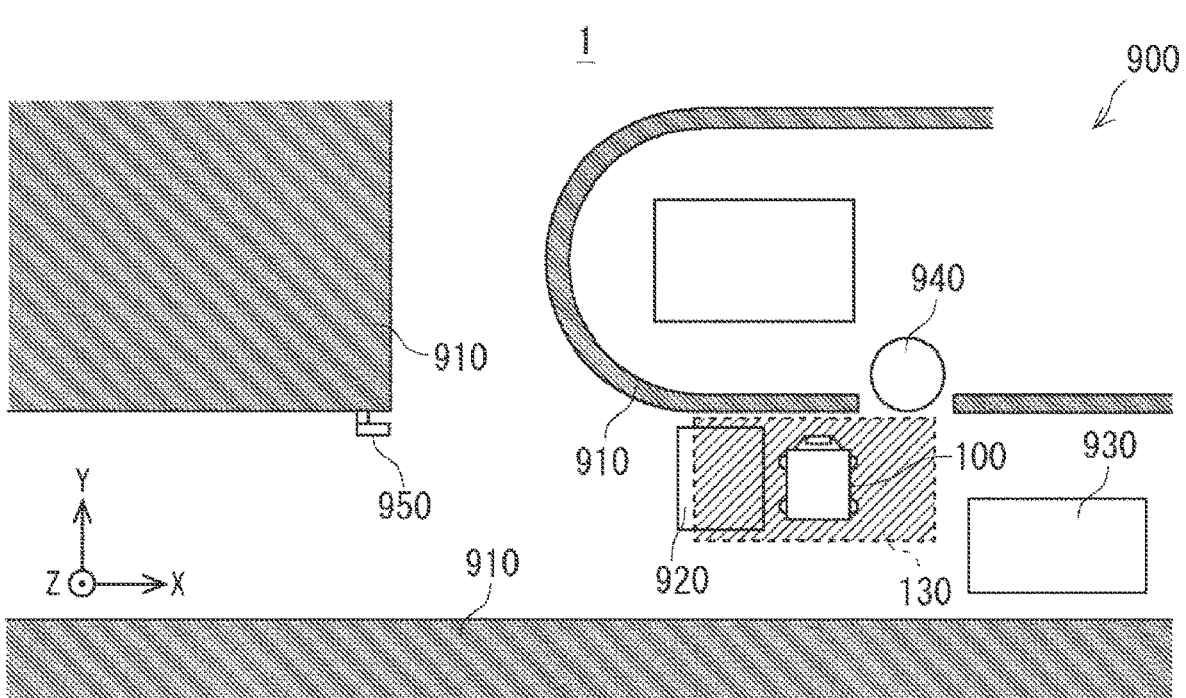
FIG. 8 is a diagram exemplifying the defense space set by the setting unit of the autonomous moving system according to the first embodiment.

The setting unit 114 sets a predetermined defense space around the autonomous moving body 100. FIGS. 7 and 8 are diagrams exemplifying a defense space 130 set by the setting unit 114 of the autonomous moving system 1 according to the first embodiment. As illustrated in FIG. 7, the setting unit 114 sets, for example, the defense space 130, which is cylindrical, around the autonomous moving body 100. The defense space 130 is a space for executing at least one of control for avoiding collision with an obstruction, and control for mitigating damage upon a collision. Specifically, the defense space 130 is a range (space) that is set to execute control to reduce the risk of collision and to mitigate damage upon a collision, when an obstruction enters or is predicted to enter the set range. The defense space 130 is a space in which the control unit 111 executes collision control. The defense space 130 may have a cylindrical shape with a central axis extending in the Z-axis direction. In FIG. 7, the defense space 130 is represented by a columnar space or a cylindrical space, centered on the autonomous moving body 100, but the size and shape of the space are decided as appropriate in accordance with the facility space 900 in which the autonomous moving body 100 is used, the size and movement performance of the autonomous moving body 100, the detection range of the detecting unit 115 and the detecting unit 950, and so forth.

Also, as illustrated in FIG. 8, the setting unit 114 may set the defense space 130, which is cuboid-shaped, around the autonomous moving body 100. The defense space 130 may have a cuboid shape surrounding the autonomous moving body 100. Note that the shape of the defense space 130 is not limited to a cylindrical shape or a cuboid shape, and may be other shapes such as a spherical shape or the like that includes the autonomous moving body 100 inside.

The detecting unit 115 detects obstructions in the vicinity of the autonomous moving body 100. The detecting unit 115 is installed in the autonomous moving body 100. The detecting unit 115 may include at least one of a sensor and a camera. The sensor may be a distance sensor, for example. The detecting unit 115 may include a plurality of sensors. The detection ability of the detecting unit 115 to detect obstructions may extend to the outside of the defense space 130. The detecting unit 115 may detect obstructions by acquiring information such as images and video of the obstructions using the camera or the like. The detecting unit 115 outputs information regarding obstructions that are detected to the classifying unit 116. Note that the autonomous moving system 1 may include the detecting unit 950. The detecting unit 950 is installed in the facility space 900 through which the autonomous moving body 100 moves. The detecting unit 950 may include at least one of a sensor and a camera. The detecting unit 950 outputs information regarding obstructions that are detected to the classifying unit 116, either via the network 800 or directly. The detecting unit 115 may be referred to as a first detecting unit, and the detecting unit 950 may be referred to as a second detecting unit.

As described above, the detecting unit 950 may or may not belong to the autonomous moving system 1. Below, forms of the autonomous moving system 1, the autonomous moving body 100, the management device 200, and the detecting unit 950, will be described as Examples 1 to 3.

A. Example 1

The autonomous moving system 1 may include the autonomous moving body 100, the management device 200, and the detecting unit 950. In this case, information regarding obstructions detected by the detecting unit 950 is output to the autonomous moving body 100 via the management device 200 or directly.

B. Example 2

The autonomous moving system 1 includes the autonomous moving body 100 and the management device 200, and the detecting unit 950 does not have to belong to the autonomous moving system 1. In this case, information regarding obstructions detected by the detecting unit 950 is output to the autonomous moving body 100 via the management device 200 or directly.

C. Example 3

The autonomous moving system 1 includes the autonomous moving body 100, and the management device 200 and the detecting unit 950 do not have to belong to the autonomous moving system 1. In this case, information regarding obstructions detected by the detecting unit 950 may be output directly to the autonomous moving body 100 or may be output to the autonomous moving body 100 via the management device 200.

The classifying unit 116 classifies the obstructions that are detected. The classifying unit 116 acquires information regarding the obstructions that are detected, from at least one of the detecting unit 115 and the detecting unit 950. For example, the classifying unit 116 acquires an image of the obstruction. The classifying unit 116 classifies the obstruction based on information regarding the obstruction that is acquired. The classifying unit 116 classifies the obstruction as being a wall 910, for example. Also, the classifying unit 116 may classify the obstruction as being the wheelchair 920, or as being the stretcher 930. The classifying unit 116 outputs information regarding the obstructions that are classified to the setting unit 114. Further, the classifying unit 116 may output information regarding the obstructions that are classified to the control unit 111.

Also, the classifying unit 116 may have an algorithm that has been subjected to machine learning using obstructions as training data. The classifying unit 116 may classify the obstructions detected by the detecting unit 115 using the algorithm that has been subjected to machine learning.

The defense space 130 is a space provided to defend the autonomous moving body 100 from obstructions. Accordingly, when there is an obstruction inside the defense space 130, the control unit 111 executes control of movement of the autonomous moving body 100, including collision control. For example, the control unit 111 may control the autonomous moving body 100 to decelerate, or to stop, as described above. Also, the control unit 111 may control the autonomous moving body 100 to move in the same direction as another autonomous moving body 100. Also, the control unit 111 may predict whether an obstruction will enter into the defense space 130. For example, the control unit 111 may predict whether the obstruction will enter into the defense space 130, based on direction and speed of the movement of the obstruction. Even when prediction is made that an obstruction will enter into the defense space 130, the control unit 111 may control the movement of the autonomous moving body 100 as described above.

As illustrated in FIG. 7, when a wall 910 is included within the defense space 130, the control unit 111 stops the movement of the autonomous moving body 100. Also, as illustrated in FIG. 8, when the wheelchair 920 is included within the defense space 130, the control unit 111 stops the movement of the autonomous moving body 100. When the movement of the autonomous moving body 100 includes starting of the autonomous moving body 100 to move, the control unit 111 stops the autonomous moving body 100 from starting to move. Accordingly, when a wall 910 or the wheelchair 920 is included within the defense space 130, the autonomous moving body 100 cannot move from the nurses station NS to another transportation destination such as a hospital room or the like.

Accordingly, in order to cancel such stopping of movement, the autonomous moving body 100 of the present embodiment changes the range of the defense space 130 based on the classification results of obstructions. Specifically, the setting unit 114 changes the range of the defense space 130 based on the obstructions classified by the classifying unit 116. FIGS. 9 to 13 are diagrams exemplifying the range of the defense space 130 that is changed by the setting unit 114 of the autonomous moving system 1 according to the first embodiment.

Figure 9:
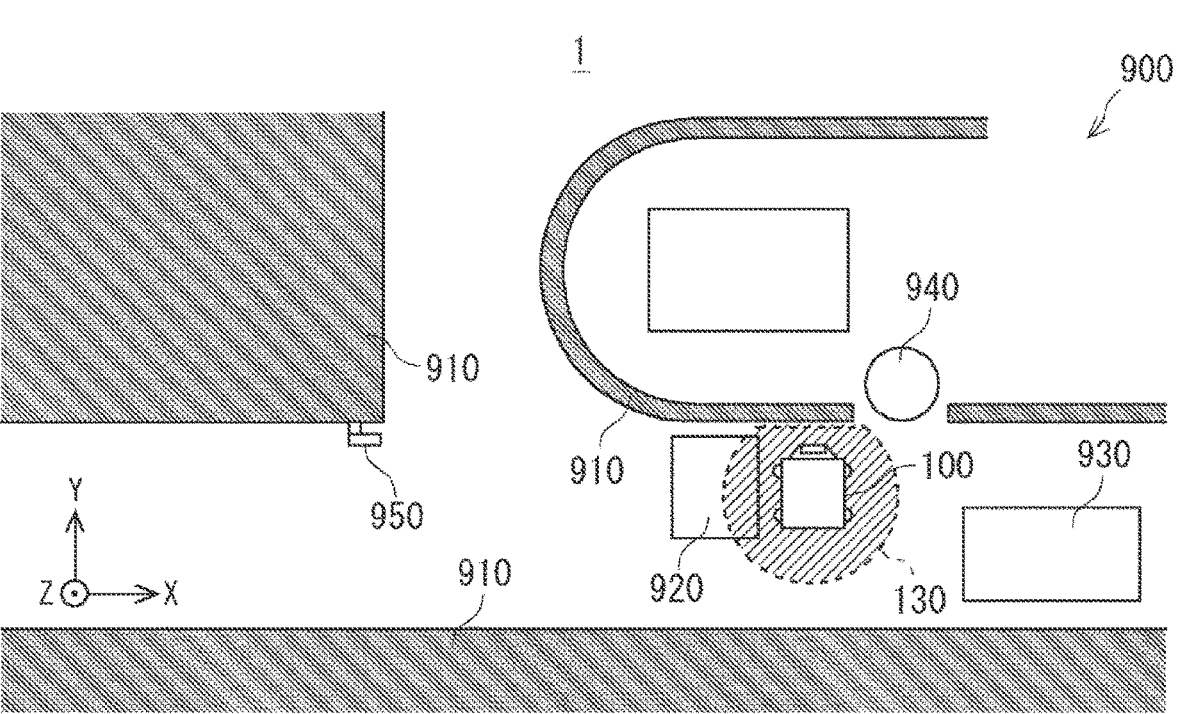
FIG. 9 is a diagram exemplifying a range of the defense space that is changed by the setting unit of the autonomous moving system according to the first embodiment.

As illustrated in FIG. 9, for example, when the classifying unit 116 classifies the obstruction as being a wall 910, the setting unit 114 excludes the portion of the wall 910 of the defense space 130 from the defense space 130. Specifically, the setting unit 114 excludes the portion of the wall 910 from the defense space 130 set around the autonomous moving body 100 so as to perform masking thereof. Thus, the columnar portion of the defense space 130 that overlaps the wall 910, of which the cross-section is an arc, is excluded therefrom. Accordingly, obstructions can be excluded from within the defense space 130, and hence the control unit 111 can cause the autonomous moving body 100 to move. For example, the control unit 111 can start the autonomous moving body 100 to move.

The setting unit 114 may set the portion excluded from the defense space 130 as a movement-prohibited space. The movement-prohibited space may be a space where movement of the autonomous moving body 100 is prohibited. The control unit 111 controls the autonomous moving body 100 so as not to enter the movement-prohibited space. Accordingly, collision of the autonomous moving body 100 with the wall 910 can be suppressed.

Figure 10:
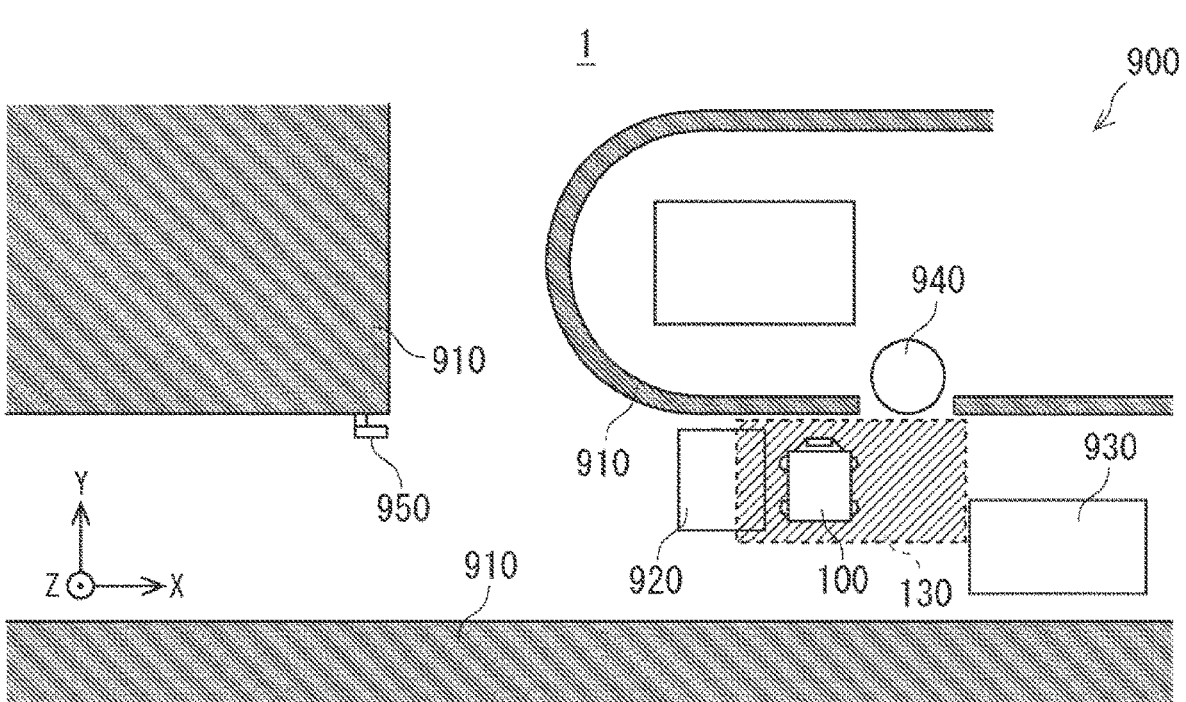
FIG. 10 is a diagram exemplifying the range of the defense space that is changed by the setting unit of the autonomous moving system according to the first embodiment.

As illustrated in FIG. 10, when the classifying unit 116 classifies the obstruction as being the wheelchair 920, the setting unit 114 reduces the width of the defense space 130 on the side thereof toward the wheelchair 920, and increases the width of the defense space 130 on the other side from the wheelchair 920. Specifically, when the wheelchair 920 is located on the minus-X-axial direction side as viewed from the autonomous moving body 100, the setting unit 114 changes the width of the defense space 130 on the minus-X-axial direction side of the autonomous moving body 100 so as to becomes smaller. On the other hand, the setting unit 114 changes the width of the defense space 130 on the plus-X-axial direction side of the autonomous moving body 100 so as to become larger.

Reducing the width of the defense space 130 on the wheelchair 920 side enables the wheelchair 920 to quickly exit from the defense space 130 when the wheelchair 920 moves. Further, when the wheelchair 920 exits the defense space 130, the autonomous moving body 100 pivots or retreats to move away from the wheelchair 920. Therefore, by increasing the width of the defense space 130 on the side opposite to the wheelchair 920, safety on the side opposite to the wheelchair 920 is ensured.

When reducing the width of the defense space 130 on the wheelchair 920 side, the width may be reduced until the wheelchair 920 is no longer in the defense space 130. Thereby, the autonomous moving body 100 can move away from the wheelchair 920 by performing movement such as pivoting or retreating.

Figure 11:
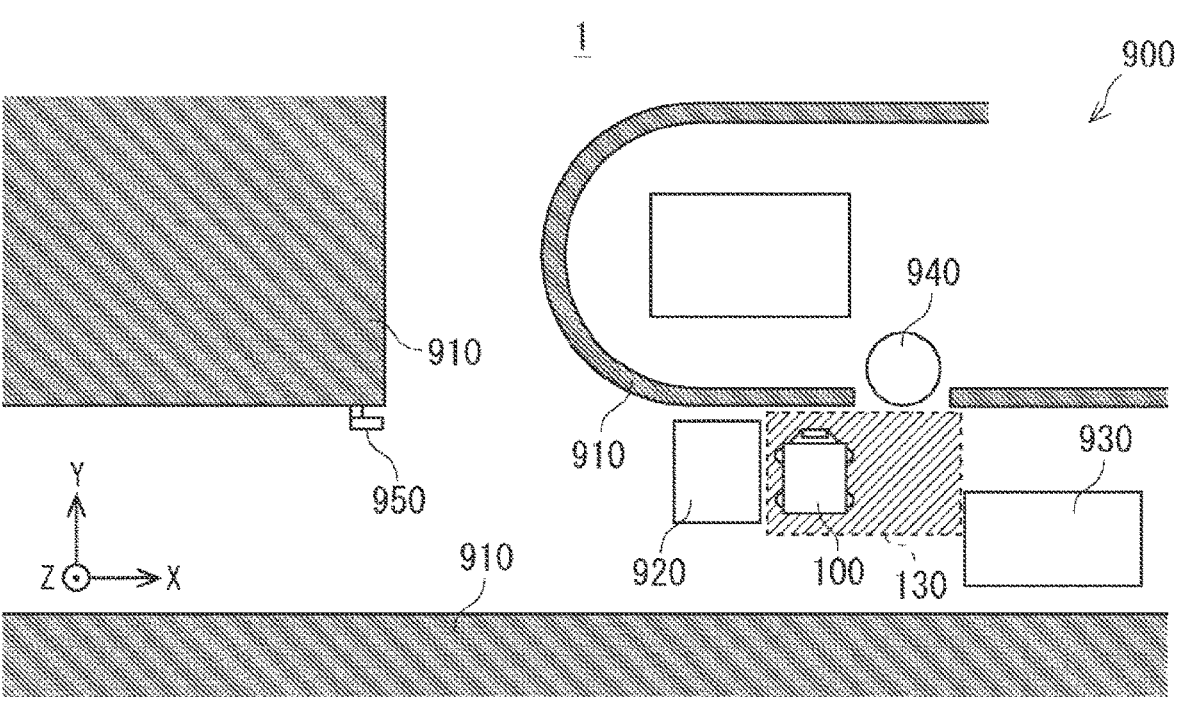
FIG. 11 is a diagram exemplifying the range of the defense space that is changed by the setting unit of the autonomous moving system according to the first embodiment.

As illustrated in FIG. 11, when the classifying unit 116 classifies the obstruction as being a wheelchair 920 that has been stopped for a predetermined period of time, as a result of detection by the detecting unit 115, the setting unit 114 may exclude the portion of the wheelchair 920 that is in the defense space 130 from the defense space 130. Also, when the classifying unit 116 classifies the obstruction as being a wheelchair 920 that a person 940 is riding, the setting unit 114 may exclude the portion of the wheelchair 920 that is in the defense space 130 from the defense space 130.

In such a case, the setting unit 114 excludes the portion of the wheelchair 920 from the defense space 130 set around the autonomous moving body 100 so as to perform masking thereof. Thus, the portion of the cuboid that overlaps the wheelchair 920 is excluded from the defense space 130. Accordingly, obstructions can be excluded from within the defense space 130, and hence the control unit 111 can cause the autonomous moving body 100 to move. The setting unit 114 may set the portion excluded from the defense space 130 as the movement-prohibited space.

In particular, when the classifying unit 116 classifies the obstruction as being a wheelchair 920 that a person 940 is riding, the control unit 111 causes the autonomous moving body 100 to move away from the wheelchair 920. Alternatively, the setting unit 114 excludes the portion of the wheelchair 920 in the defense space 130 from the defense space 130, and thereafter the control unit 111 causes the autonomous moving body 100 to move away from the wheelchair 920. Thus, even when the wheelchair 920 that the person 940 is riding moves, the autonomous moving body 100 can be suppressed from colliding with the wheelchair 920.

Figure 12:
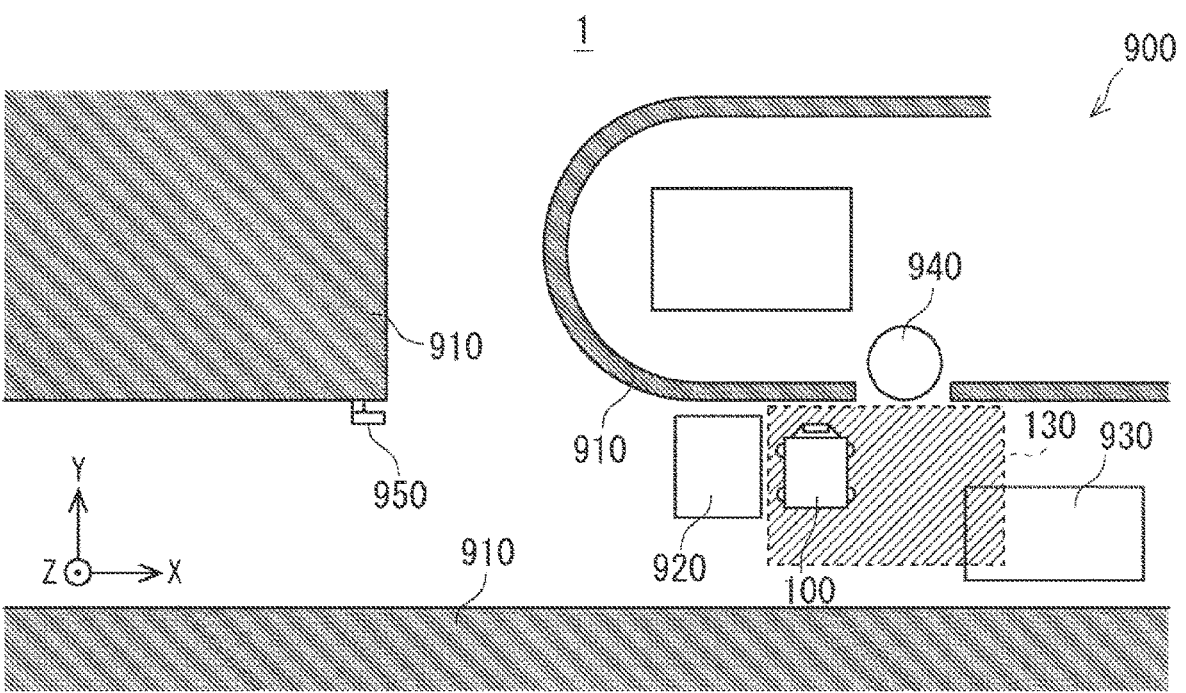
FIG. 12 is a diagram exemplifying the range of the defense space that is changed by the setting unit of the autonomous moving system according to the first embodiment.

As illustrated in FIG. 12, when the classifying unit 116 classifies the obstruction as being a stretcher 930, the setting unit 114 enlarges the defense space 130. Specifically, the setting unit 114 expands the defense space 130 set around the autonomous moving body 100 by a predetermined width in a predetermined direction, for example. For example, the setting unit 114 expands the defense space 130 to the space through which the stretcher 930 will pass, in the direction in which the stretcher 930 will advance. At this time, the setting unit 114 may exclude the wall 910 portion and the stretcher 930 portion of the defense space 130 from the defense space 130.

Movement of the stretcher 930 may be urgent. Accordingly, the speed of movement of the stretcher 930 is fast. The stretcher 930 may also be accompanied by various types of equipment and a person 940 performing treatment. For this reason, it is desirable to have a certain level of leeway in the space between the autonomous moving body 100 and the stretcher 930.

When the classifying unit 116 classifies the obstruction as being the stretcher 930, the setting unit 114 enlarges the defense space 130, so that collision with the stretcher 930 can be suppressed. Note that in such a case, it is desirable that the control unit 111 causes the autonomous moving body 100 to exit the space through which the stretcher 930 will pass, in the direction in which the stretcher 930 will advance. Thus, collision with the stretcher 930 can be further suppressed.

There are cases in which obstructions in the vicinity of the autonomous moving body 100 that are detected by the detecting unit 115 installed in the autonomous moving body 100 are different from obstructions in the vicinity of the autonomous moving body 100 that are detected by the detecting unit 950 installed in the facility space 900. For example, the detecting unit 115 may detect an obstruction at a position that is a blind spot to the detecting unit 950. Conversely, the detecting unit 950 may detect an obstruction at a position that is a blind spot to the detecting unit 115.

For example, as illustrated in FIG. 9, the detecting unit 115 detects a wall 910 as an obstruction. When the classifying unit 116 classifies the obstruction as being a wall 910, the setting unit 114 excludes the portion of the wall 910 in the defense space 130 from the defense space 130. Thus, the setting unit 114 changes the defense space 130 to a first range.

Figure 13:
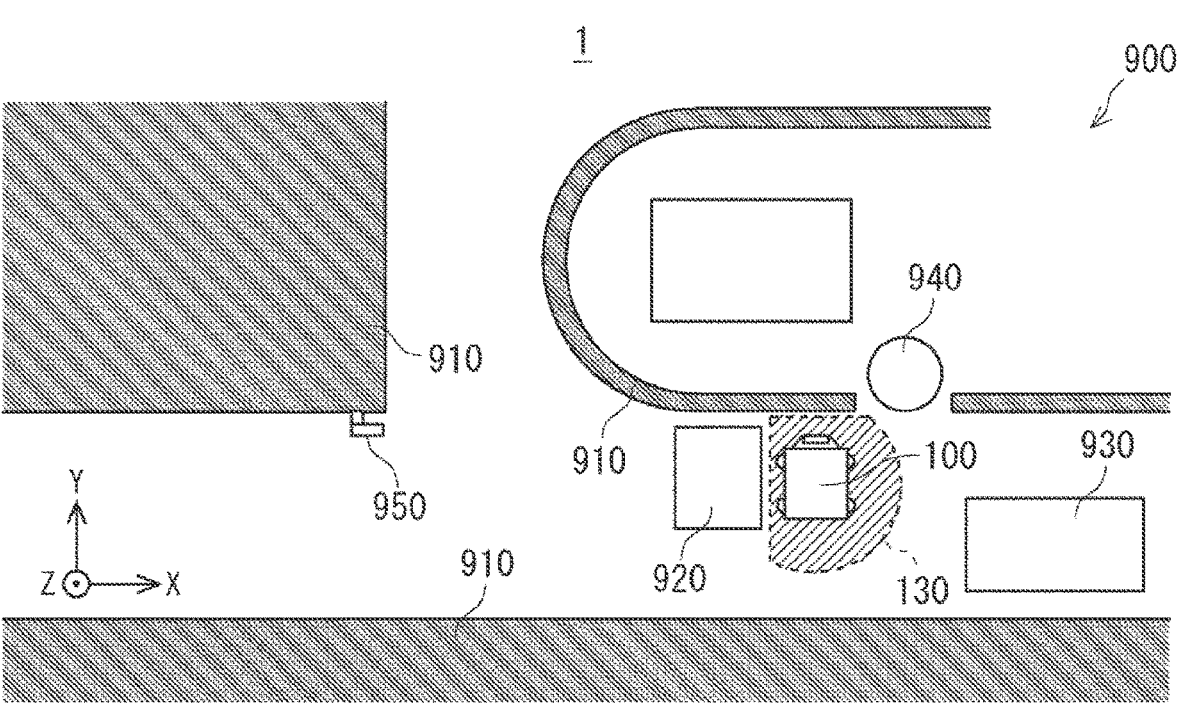
FIG. 13 is a diagram exemplifying the range of the defense space that is changed by the setting unit of the autonomous moving system according to the first embodiment.

However, there are cases in which the detecting unit 115 cannot detect whether the wheelchair 920 is in a state of being stopped for a predetermined period of time. Also, the detecting unit 115 may not be able to detect whether a person is riding in the wheelchair 920 because the wheelchair 920 is facing the opposite direction. Accordingly, the classifying unit 116 uses the information of the obstructions detected by the detecting unit 950 to classify obstructions in the vicinity of the autonomous moving body 100. The setting unit 114 then further changes the range of the defense space 130 based on the obstructions classified by the classifying unit 116. For example, as illustrated in FIG. 13, the detecting unit 950 detects a wheelchair 920 that has been stopped for a predetermined period of time as being an obstruction in the vicinity of the autonomous moving body 100. When the classifying unit 116 classifies the obstruction as being a wheelchair 920 that has been stopped for a predetermined period of time, the setting unit 114 excludes the portion of the wheelchair 920 in the defense space 130 from the defense space 130. Accordingly, the setting unit 114 changes the range of the defense space 130 from the first range to a second range.

Thus, the setting unit 114 sets the defense space 130 to the first range based on the obstructions detected by the detecting unit 115, and then changes the defense space 130 from the first range to the second range based on the obstructions detected by the detecting unit 950. Note that the setting unit 114 may set the defense space 130 to the first range based on the obstructions detected by the detecting unit 950, and then change the defense space 130 from the first range to the second range based on the obstructions detected by the detecting unit 115. Also, the setting unit 114 may set the defense space 130 to the first range based on the obstructions detected by the detecting unit 115, and then change the defense space 130 from the first range to the second range based on the obstructions detected by the detecting unit 115 and the obstructions detected by the detecting unit 950. Further, the setting unit 114 may set the defense space 130 to the first range based on the obstructions detected by the detecting unit 950, and then change the defense space 130 from the first range to the second range based on the obstructions detected by the detecting unit 115 and the obstructions detected by the detecting unit 950.

Thus, the setting unit 114 changes the range of the defense space to the first range based on the result of the classifying unit 116 classifying the obstructions detected by one of the detecting unit 115 and the detecting unit 950, and then changes the range of the defense space from the first range to the second range based on the result of the classifying unit 116 classifying the obstructions detected by at least the other. In this way, the setting unit 114 can perform sensor fusion and classification by changing the defense space 130 from the first range to the second range based on the obstructions detected by the detecting unit 115 and the obstructions detected by the detecting unit 950. Accordingly, the setting unit 114 can make the changed second range to be a more appropriate range. The control unit 111 stops the movement of the autonomous moving body 100 when there is an obstruction in the first range and the second range of the defense space 130.

As illustrated in FIG. 5, the management device 200 includes the control unit 211, the storage unit 212, and the communication unit 213. The control unit 211 may control the autonomous moving body 100 in the same way as the control unit 111. Also, the control unit 211 may control movement of multiple autonomous moving bodies 100.

The control unit 211 has a function of being capable of executing a program, for example, as with a CPU of a computer or the like. Functions of each part of the autonomous moving body 100 can also be realized by a program.

The storage unit 212 stores various types of data for movement of the autonomous moving body 100, in the same way as with the storage unit 112. The storage unit 212 stores, for example, data input by the user U, such as a transportation destination of a transport item, and so forth. The communication unit 213 acquires data such as images, videos, and so forth, from the detecting unit 950. Also, the communication unit 213 exchanges various types of data between the user terminal 820 and the autonomous moving body 100.

Figure 14:
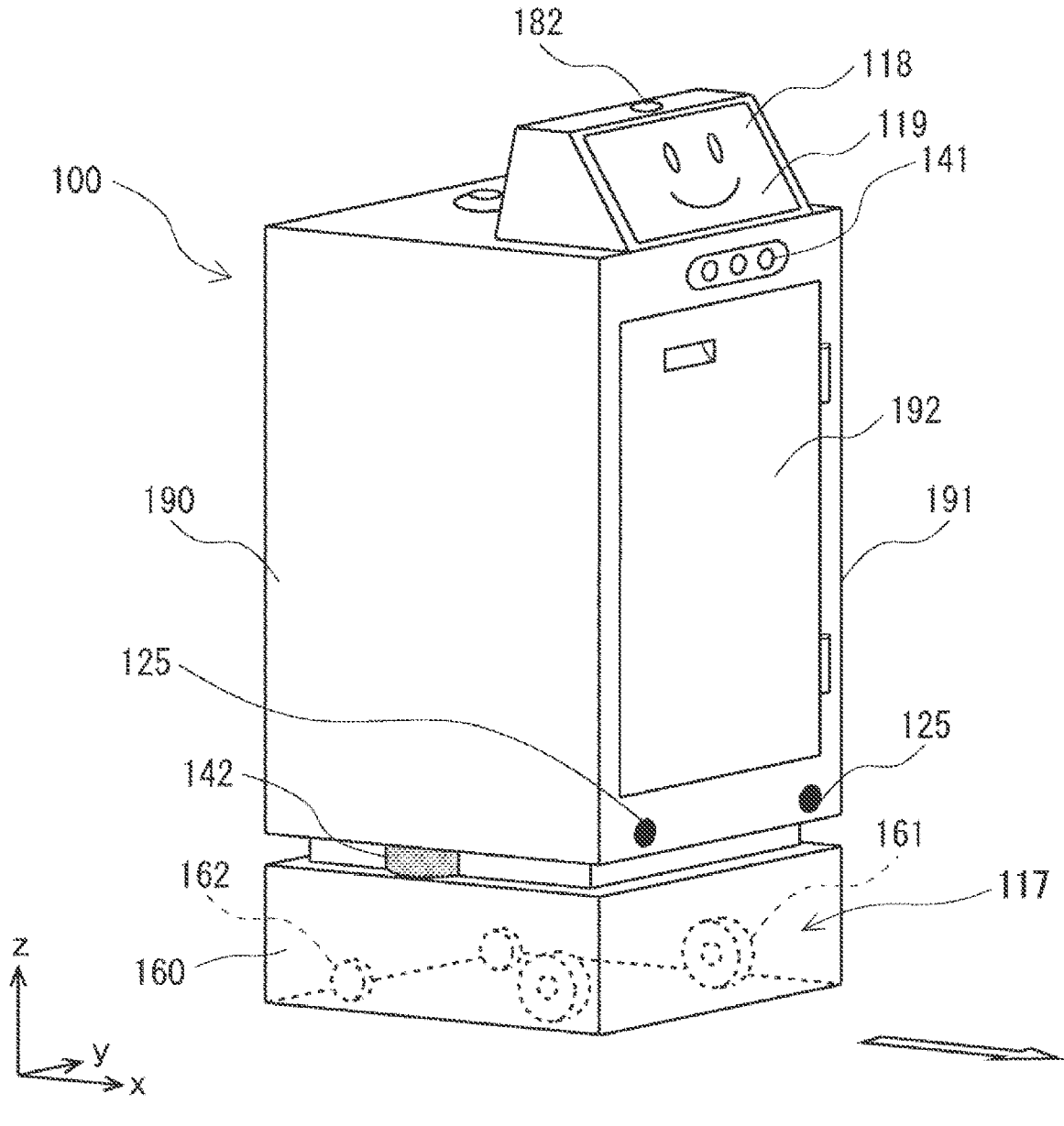
FIG. 14 is a schematic diagram exemplifying the autonomous moving body in the autonomous moving system according to the first embodiment.

Next, the drive unit 117, the display unit 118, and the operation accepting unit 119 will be described with reference to the drawings. FIG. 14 is a schematic diagram exemplifying the autonomous moving body 100 in the autonomous moving system 1 according to the first embodiment. The autonomous moving body 100 illustrated in FIG. 14 is one form of the autonomous moving body 100, and may be in another form. Note that FIG. 14 illustrates the autonomous moving body 100 when a forward direction of the autonomous moving body 100 is toward the plus-X-axial direction and a rearward direction thereof is toward the minus-X-axial direction. In this case, a Y-axial direction is a right-left direction of the autonomous moving body 100, and the Z-axial direction is a height direction of the autonomous moving body 100.

The autonomous moving body 100 includes a main body section 190 and a bogie section 160. The main body section 190 is installed on the bogie section 160. The main body section 190 and the bogie section 160 each have a cuboid-shaped housing, and the components are installed inside the housings. For example, the drive unit 117 is housed inside the bogie section 160.

The main body section 190 is provided with storage 191 that serves as a storage space, and a door 192 that closes off the storage 191. The storage 191 is provided with a plurality of shelves, and availability is managed for each shelf. For example, the availability can be updated by providing various types of sensors, such as a weight sensor, in each shelf. The autonomous moving body 100 moves autonomously to transport the transport items stored in the storage 191 to destinations under instruction from the management device 200. The main body section 190 may be equipped with a control box or the like, omitted from illustration, in the housing. Further, the door 192 may be capable of being locked with an electronic key or the like. Upon arriving at the transportation destination, the user U unlocks the door 192 with the electronic key. Alternatively, the door 192 may automatically be unlocked upon arrival at the transportation destination.

As illustrated in FIG. 14, front-rear distance sensors 141 and right-left distance sensors 142 are provided as a sensor group on the exterior of the autonomous moving body 100. The autonomous moving body 100 measures distances to objects in the vicinity in front and rear directions of the autonomous moving body 100, using the front-rear distance sensors 141. Thus, the detecting unit 115 detects obstructions in the vicinity of the autonomous moving body 100 in the front and rear directions. Also, the autonomous moving body 100 measures distances to objects in the vicinity in the right and left directions of the autonomous moving body 100, using the right-left distance sensors 142. Thus, the detecting unit 115 detects obstructions in the vicinity of the autonomous moving body 100 in the right-left direction.

For example, the front-rear distance sensors 141 are provided on each of a front face and a rear face of the housing of the main body section 190. The right-left distance sensors 142 are provided on each of a right side face and a left side face of the housing of the main body section 190. The front-rear distance sensors 141 and the right-left distance sensors 142 are, for example, ultrasonic distance sensors or laser rangefinders.

The drive unit 117 is provided with drive wheels 161 and casters 162. The drive wheels 161 are wheels for moving the autonomous moving body 100 forward, rearward, rightward, and leftward. The casters 162 are driven wheels that roll following the drive wheels 161, without being given driving force. The drive unit 117 includes a drive motor that is omitted from illustration and that drives the drive wheels 161.

For example, the drive unit 117 supports, within the housing, two drive wheels 161 and two casters 162, which are each in contact with a traveling surface. The two drive wheels 161 are arranged such that rotation axes thereof match each other. The drive wheels 161 are each independently rotationally driven by a motor that is omitted from illustration. The casters 162 are driven wheels, and follow the moving direction of the drive unit 117.

For example, when the two drive wheels 161 are rotated in the same direction at the same rotation speed, the autonomous moving body 100 travels straight, and when the two drive wheels 161 are rotated in opposite directions at the same rotation speed, the autonomous moving body 100 pivots about a vertical axis extending through the substantial middle between the two drive wheels 161. By rotating the two drive wheels 161 in the same direction at different rotation speeds, the autonomous moving body 100 can travel while turning right or left. For example, the autonomous moving body 100 can make a right turn by making the rotation speed of the left drive wheel 161 to be faster than the rotation speed of the right drive wheel 161. Conversely, the autonomous moving body 100 can make a left turn by making the rotation speed of the right drive wheel 161 to be faster than the rotation speed of the left drive wheel 161. That is to say, the autonomous moving body 100 can travel straight, pivot, turn right or left, and so forth, in any direction, by controlling each of the rotation directions and the rotation speeds of the two drive wheels 161.

In the autonomous moving body 100, the display unit 118 and the operation accepting unit 119 are provided on an upper face of the main body section 190. The operation accepting unit 119 is displayed on the display unit 118. The operation accepting unit 119 can receive instructions that are input from the user by the user performing a touch operation on the operation accepting unit 119 displayed on the display unit 118. An emergency stop button 182 may be provided on an upper face of the display unit 118.

The display unit 118 is, for example, a liquid crystal panel that displays an illustration of a face of a character, presents information regarding the autonomous moving body 100 in text or by icons, and so forth. Displaying the face of the character on the display unit 118 can give observers in the surroundings an impression that the display unit 118 is a pseudo face portion. The display unit 118 and so forth that are installed in the autonomous moving body 100 can also be used as the user terminal 820.

Cameras 125 are installed on the front face of the main body section 190. Here, two cameras 125 function as a stereo camera. That is to say, the two cameras 125 having the same angle of view are provided away from each other in a horizontal direction. Images taken by each of the cameras 125 are output as image data. Distance to a subject, and the size of the subject, can be calculated based on the image data from the two cameras 125. The classifying unit 116 can classify obstructions by analyzing information from the sensor group and images taken by the cameras 125. When there are people, obstructions, or the like, at positions forward in the direction of advance, the autonomous moving body 100 moves along the route while avoiding them. Also, the image data from the cameras 125 may be transmitted to the management device 200.

Figure 15:
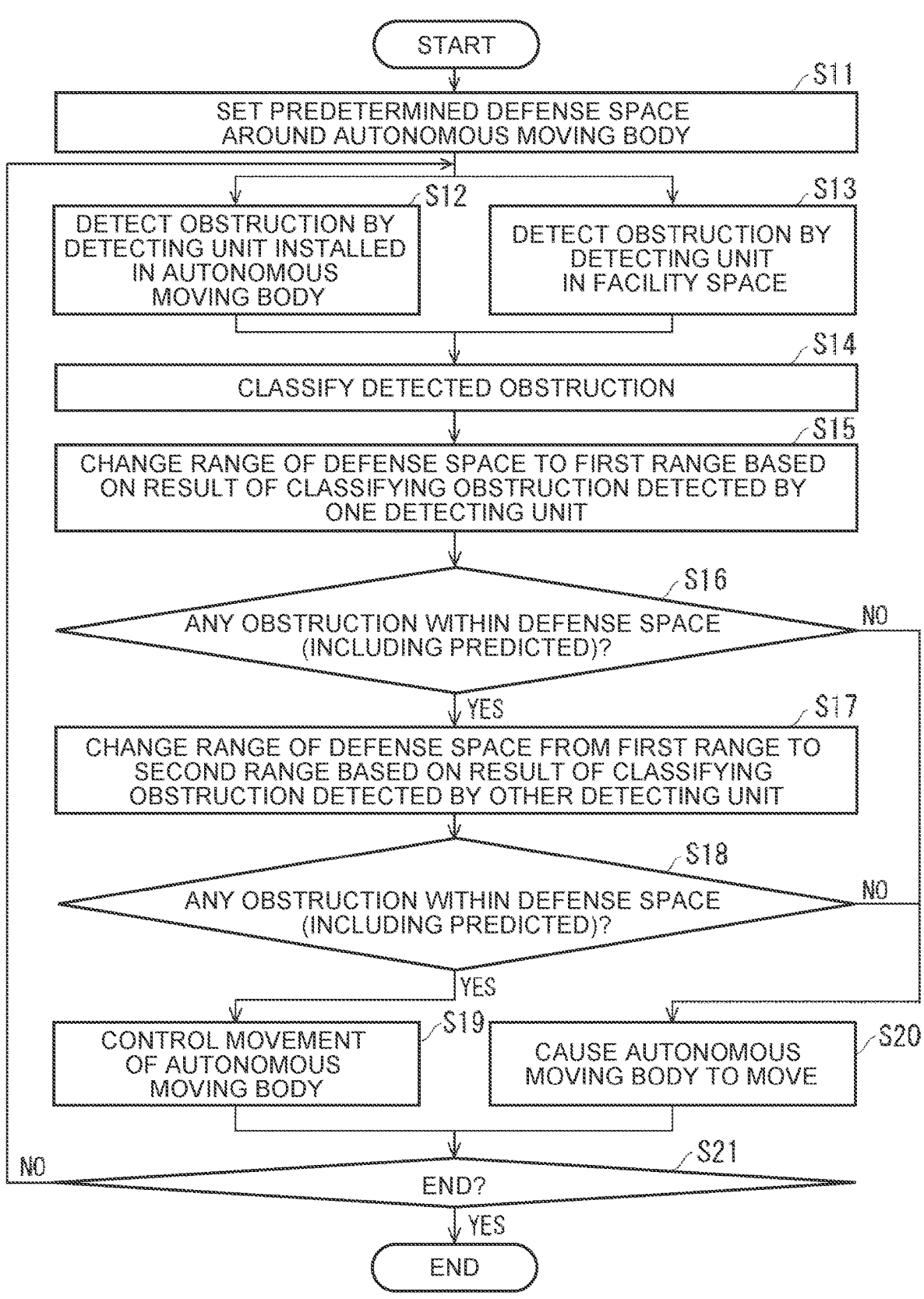
FIG. 15 is a flowchart exemplifying an autonomous moving method for the autonomous moving body according to the first embodiment.

Next, an autonomous moving method for the autonomous moving body 100 will be described. FIG. 15 is a flowchart exemplifying the autonomous moving method for the autonomous moving body 100 according to the first embodiment.

As shown in step S11 in FIG. 15, a predetermined defense space 130 is set around the autonomous moving body 100. Specifically, the setting unit 114 sets a predetermined defense space 130 in a cylindrical shape, a cuboid shape, or the like, around the autonomous moving body 100.

Next, as shown in step S12, the detecting unit 115 installed in the autonomous moving body 100 is caused to detect obstructions in the vicinity the autonomous moving body 100. Also, as shown in step S13, the detecting unit 950 such as a facility camera is caused to detect obstructions in the vicinity of the autonomous moving body 100. Note that the detection ranges of the detecting unit 115 and the detecting unit 950 may extend to the vicinity of the autonomous moving body 100, i.e., outside of the defense space 130.

Next, as shown in step S14, the obstructions that are detected are classified. Specifically, the classifying unit 116 is caused to classify the obstructions that are detected. The classifying unit 116 may classify the obstructions using an algorithm that is subjected to machine learning using the obstructions as training data.

Next, as shown in step S15, the range of the defense space 130 is changed to the first range, based on the result of classifying the obstructions detected by one of the detecting unit 115 and the detecting unit 950. For example, the range of the defense space 130 is changed to the first range, based on the result of classifying the obstructions detected by the detecting unit 115 installed in the autonomous moving body 100. Specifically, when the classifying unit 116 classifies the obstruction detected by the detecting unit 115 as being a wall 910, the setting unit 114 excludes the portion of the wall 910 in the defense space 130 from the defense space 130.

Next, as shown in step S16, determination is made regarding whether there is an obstruction inside the defense space 130. Specifically, the control unit 111 makes the determination. Note that the control unit 111 may predict whether an obstruction will enter into the defense space 130. When there is no obstruction inside the defense space 130 in step S16 (NO in step S16), the control unit 111 causes the autonomous moving body 100 to move, as shown in step S20. The flow then advances to step S21.

On the other hand, when there is an obstruction inside the defense space 130 or when a prediction is made that the obstruction will enter into the defense space 130 in step S16 (YES in step S16), the range of the defense space 130 is changed from the first range to the second range based on the result of classifying obstructions detected by at least the other of the detecting unit 115 and the detecting unit 950, as shown in step S17. For example, the range of the defense space 130 is changed from the first range to the second range based on the result of classifying obstructions detected by the detecting unit 950 installed in the facility space 900. Specifically, when the classifying unit 116 classifies the obstruction detected by the detecting unit 950 as being a wheelchair 920 that has been stopped for a predetermined period of time, the setting unit 114 excludes the portion of the wheelchair 920 in the defense space 130 from defense space 130.

Next, as shown in step S18, determination is made regarding whether there is an obstruction inside the defense space 130. Note that the control unit 111 may predict whether an obstruction will enter into the defense space 130. When there is no obstruction inside the defense space 130 in step S18 (NO in step S18), the control unit 111 causes the autonomous moving body 100 to move, as shown in step S20. The flow then advances to step S21.

On the other hand, when there is an obstruction inside the defense space 130 or when a prediction is made that the obstruction will enter into the defense space 130 in step S18 (YES in step S18), control of movement of the autonomous moving body 100, including collision control, is executed, as shown in step S19. The movement of the autonomous moving body 100 includes the autonomous moving body 100 starting to move, and the control unit 111 may stop the autonomous moving body 100 from starting to move, based on the obstructions that are classified. The flow then advances to step S21.

Next, as shown in step S21, the control unit 111 determines whether to end the flow. When the processing is not to be ended, due to the task such as transporting articles or the like not having been completed, or a predetermined period of time not having elapsed or the like (NO in step S21), the flow returns to steps S12 and S13, and steps S12 to S21 are repeated.

On the other hand, when the processing is to be ended in step S21, due to the task such as transporting articles or the like having been completed, or a predetermined period of time having elapsed or the like (YES in step S21), the processing ends.

The autonomous moving method according to the present embodiment may be performed by the autonomous moving body 100 alone, or may be performed by the management device 200. Also, the autonomous moving body 100 and the management device 200 may collaboratively execute the autonomous moving method.

Next, effects of the present embodiment will be described. The autonomous moving system 1 according to the present embodiment detects obstructions in the vicinity of the autonomous moving body 100 and classifies the obstructions that are detected. The autonomous moving system 1 then changes the range of the defense space 130 based on the obstructions that are classified. Accordingly, even when there is an obstruction in the defense space 130 of the autonomous moving body 100, the autonomous moving system 1 can exclude the obstruction from the defense space 130 by changing the range of the defense space 130 based on the obstruction. Thus, the autonomous moving body 100 can be made to move. In this way, the autonomous moving system 1 can change actions depending on the situation in the vicinity of the autonomous moving body 100, and can cause the autonomous moving body 100 to safely move.

The setting unit 114 changes the range of the defense space 130 to the first range, based on the result of classifying the obstructions detected by one of the detecting unit 115 and the detecting unit 950. When the obstruction is still inside the defense space 130, the range of the defense space 130 is changed from the first range to the second range, based on the result of classification of the obstruction that has been detected by the other of the detecting unit 115 and the detecting unit 950. Accordingly, even when the control unit 111 stops the autonomous moving body 100 based on an obstruction detected by one of the detecting unit 115 and the detecting unit 950, in a situation in which the obstruction can be excluded from inside of the defense space 130, as a result of changing the range of the defense space 130 based on the obstruction detected by the other thereof, the control unit 111 can cause the autonomous moving body 100 to move. Thus, the autonomous moving body 100 can be made to move safely, since the situation in the vicinity of the autonomous moving body 100 can be meticulously handled. Also, the detection result obtained using the detecting unit 115 installed in the autonomous moving body 100 can be updated or modified based on the detection result obtained using the detecting unit 950, such as an infrastructure camera installed in the facility space 900 with a different viewpoint, or the like, and accordingly the precision of detecting obstructions can be improved. Conversely, the same effect can be yielded by updating or modifying the detection result obtained using the detecting unit 950, by the detection result obtained using the detecting unit 115.

Movement of the autonomous moving body 100 may include the autonomous moving body 100 starting to move. Accordingly, the autonomous moving system 1 can safely start the autonomous moving body 100 to move, in accordance with the situation in the vicinity of the autonomous moving body 100.

Obstructions may be classified using an algorithm that has been subjected to machine learning. The precision of classifying obstructions can be improved.

Deciding actions of the autonomous moving body 100 when the classifying unit 116 classifies obstructions into walls 910, wheelchairs 920, and stretchers 930, enables the actions to be changed depending on the situation. Thus, the autonomous moving body 100 can be made to move safely.

Modification

Next, a modification will be described. In the first embodiment described above, the setting unit 114 changes the range of the defense space 130 to the first range based on the result of the classifying unit 116 classifying an obstruction detected by one of the detecting unit 115 and the detecting unit 950, and changes the range of the defense space 130 from the first range to the second range based on the result of classification of the obstructions detected by the other. In the present modification, when changing the range of the defense space 130 from the first range to the second range based on the result of classifying obstructions detected by the other, the setting unit 114 performs the processing thereof based on the result of sensor fusion of the result of one detecting unit and the result of the other detecting unit. That is to say, the result of classifying the obstruction detected by the other includes the result of sensor fusion of the result of one detecting unit and the result of the other detecting unit. In this way, performing sensor fusion of the result of one detecting unit and the result of the other detecting unit enables the precision of obstruction classification to be improved, as compared to a case of using only one detecting unit, and the second range can be set as a range corresponding to obstructions.

Second Embodiment

Next, an autonomous moving system according to a second embodiment will be described. The autonomous moving system according to the present embodiment uses map information of the facility space 900.

The storage unit 112 stores the map information of the facility space 900. The map information includes, for example, a floor map of the facility space 900. The floor map may be created in advance, may be generated from information obtained from the autonomous moving body 100, or may be created by adding information obtained from the autonomous moving body 100 to a basic floor map created in advance. The floor map includes information on positions and layout of walls 910, gates, doors, stairs, elevators, fixed shelves, and so forth, in the facility space 900. The floor map may be expressed as a two-dimensional grid map. In this case, information regarding the walls 910, doors, and so forth, is associated with each grid in the floor map.

The setting unit 114 may change the range of the defense space 130 based on the map information acquired from the storage unit 112. When acquiring the map information of the walls 910 from the storage unit 112, the setting unit 114 excludes the portion of the walls 910 in the acquired map information from the defense space 130. Thus, acquiring obstructions in the facility space 900 from the storage unit 112 enables detection by the detecting unit 115 and classification by the classifying unit 116 to be omitted, and smooth movement of the autonomous moving body 100 can be facilitated.

Also, the classifying unit 116 may classify obstructions based on the map information acquired from the storage unit 112. When the classifying unit 116 acquires the map information of the walls 910 from the storage unit 112, the classifying unit 116 compares the positions of obstructions that are detected with the positions of the walls 910 in the map information. When the two match, the classifying unit 116 classifies the obstructions as being walls 910. In this way, acquiring the map information in the facility space 900 from the storage unit 112 enables precision of classifying obstructions to be improved.

The map information is not limited to being stored in the storage unit 112 of the autonomous moving body 100 and may be stored in the storage unit 212 of the management device 200. The setting unit 114 and the classifying unit 116 may acquire map information from the storage unit 212 of the management device 200.

While embodiments of the present disclosure have been described above, the present disclosure includes modifications that are made appropriately and that do not diminish the object and advantages thereof, and is not limited by the above embodiments. A combination of the configurations of the first embodiment and the second embodiment is also encompassed by the scope of the technical idea of the present embodiment. Also, the autonomous moving method described below, and an autonomous moving program described below that causes a computer to execute the autonomous moving method, are also encompassed by the scope of the technical idea of the present embodiment.

Part or all of the processing in the management device 200, the autonomous moving body 100, and so forth, that are described above, can be realized as a computer program. Such a program can be stored using various types of non-transitory computer-readable media, and supplied to a computer. The non-transitory computer-readable media include various types of tangible recording media. Examples of the non-transitory computer-readable media include magnetic recording media (e.g., flexible disks, magnetic tape, hard disk drives), magneto-optical recording media (e.g., magneto-optical disks), compact disc read-only memory (CD-ROM), compact disc recordable (CD-R), compact disc rewritable (CD-R/W), and semiconductor memory (e.g., mask ROM, programmable ROM (PROM), erasable PROM (EPROM), flash ROM, and random access memory (RAM)). The program may also be supplied to the computer by various types of transitory computer-readable media. Examples of the transitory computer-readable media include electrical signals, optical signals, and electromagnetic waves. The transitory computer-readable media can supply the program to the computer via wired communication paths such as electric wires, optical fibers, and so forth, or a wireless communication path.

Appendix 1

An autonomous moving method for an autonomous moving body that moves autonomously, the autonomous moving method including setting a predetermined defense space around the autonomous moving body, for executing collision control of at least one of control to avoid a collision between the autonomous moving body and an obstruction and control to mitigate damage upon a collision, classifying an obstruction in a vicinity of the autonomous moving body that is detected by a first detecting unit installed in the autonomous moving body, and the obstruction in the vicinity of the autonomous moving body that is detected by a second detecting unit installed in a facility space through which the autonomous moving body moves, changing a range of the defense space to a first range based on a result of classification of the obstruction, detected by one of the first detecting unit and the second detecting unit, changing the range of the defense space from the first range to a second range based on a result of classifying the obstruction detected by at least another of the first detecting unit and the second detecting unit, and executing control of movement of the autonomous moving body including the collision control in at least one of when the obstruction is inside the defense space and when the obstruction is predicted to enter inside the defense space.

Appendix 2

The autonomous moving method according to Appendix 1, wherein the movement of the autonomous moving body includes the autonomous moving body starting to move, and in stopping of the movement of the autonomous moving body, the autonomous moving body is stopped from starting to move, based on the obstruction that is classified.

Appendix 3

The autonomous moving method according to Appendix 1, wherein, in stopping of the movement of the autonomous moving body, movement of the autonomous moving body is stopped when the obstruction is present in the first range and the second range.

Appendix 4

The autonomous moving method according to Appendix 1, wherein, in the classifying of the obstruction that is detected, the obstruction that is detected is classified by using an algorithm that is subjected to machine learning using the obstruction as training data.

Appendix 5

The autonomous moving method according to Appendix 1, wherein, in the classifying of the obstruction that is detected, when the obstruction is classified as a wall, the portion of the wall of the defense space is excluded from the defense space in the changing of the range of the defense space to the first range and in the changing the range of the defense space from the first range to the second range.

Appendix 6

The autonomous moving method according to Appendix 1, wherein, in the classifying of the obstruction that is detected, when the obstruction is classified as a wheelchair, a width of the defense space on a wheelchair side is reduced and the width of the defense space on an opposite side from the wheelchair is increased, in the changing of the range of the defense space to the first range and in the changing the range of the defense space from the first range to the second range.

Appendix 7

The autonomous moving method according to Appendix 6, wherein, in the classifying of the obstruction that is detected, when the obstruction is classified as the wheelchair in a state of being stopped for a predetermined period of time, the portion of the wheelchair of the defense space is excluded from the defense space in the changing of the range of the defense space to the first range and in the changing the range of the defense space from the first range to the second range.

Appendix 8

The autonomous moving method according to Appendix 6, further including, in the classifying of the obstruction that is detected, causing the autonomous moving body to move away from the wheelchair when the obstruction is classified as the wheelchair that a person is riding in.

Appendix 9

The autonomous moving method according to Appendix 1, further including, in the classifying of the obstruction that is detected, enlarging the defense space and causing the autonomous moving body to move out of a space through which the stretcher passes in a direction in which the stretcher advances when the obstruction is classified as a stretcher, in the changing of the range of the defense space to the first range and in the changing the range of the defense space from the first range to the second range.

Appendix 10

The autonomous moving method according to Appendix 1, further including storing map information of the facility space through which the autonomous moving body moves, and in the classifying of the obstruction that is detected, causing the obstruction, based on the map information.

Appendix 11

A storage medium storing instructions that are executable by one or more processors and that cause the one or more processors to perform functions including
   setting a predetermined defense space around the autonomous moving body, for executing collision control of at least one of control to avoid a collision between the autonomous moving body and an obstruction and control to mitigate damage upon a collision,
   classifying an obstruction in a vicinity of the autonomous moving body that is detected by a first detecting unit installed in the autonomous moving body, and the obstruction in the vicinity of the autonomous moving body that is detected by a second detecting unit installed in a facility space through which the autonomous moving body moves,
   changing a range of the defense space to a first range based on a result of classification of the obstruction, detected by one of the first detecting unit and the second detecting unit,
   changing the range of the defense space from the first range to a second range based on a result of classifying the obstruction detected by at least another of the first detecting unit and the second detecting unit, and
   executing control of movement of the autonomous moving body including the collision control in at least one of when the obstruction is inside the defense space and when the obstruction is predicted to enter inside the defense space.

Appendix 12

The storage medium according to Appendix 11, wherein the movement of the autonomous moving body includes the autonomous moving body starting to move, and the function causes a computer to execute, in stopping of the movement of the autonomous moving body, stopping the autonomous moving body from starting to move, based on the obstruction that is classified.

Appendix 13

The storage medium according to Appendix 11, wherein a computer is caused to execute, in stopping of the movement of the autonomous moving body, stopping of movement of the autonomous moving body when the obstruction is present in the first range and the second range.

Appendix 14

The storage medium according to Appendix 11, wherein a computer is caused to execute, in the classifying of the obstruction that is detected, classifying of the obstruction that is detected by using an algorithm that is subjected to machine learning using the obstruction as training data.

Appendix 15

The storage medium according to Appendix 11, wherein, wherein a computer is caused to execute, in the classifying of the obstruction that is detected, when the obstruction is classified as a wall, excluding the portion of the wall of the defense space from the defense space in the changing of the range of the defense space to the first range and in the changing the range of the defense space from the first range to the second range.

Appendix 16

The storage medium according to Appendix 11, wherein a computer is caused to execute, in the classifying of the obstruction that is detected, when the obstruction is classified as a wheelchair, reducing a width of the defense space on a wheelchair side and increasing the width of the defense space on an opposite side from the wheelchair, in the changing of the range of the defense space to the first range and in the changing the range of the defense space from the first range to the second range.

Appendix 17

The storage medium according to Appendix 16, wherein a computer is caused to execute, in the classifying of the obstruction that is detected, when the obstruction is classified as the wheelchair in a state of being stopped for a predetermined period of time, excluding the portion of the wheelchair of the defense space from the defense space in the changing of the range of the defense space to the first range and in the changing the range of the defense space from the first range to the second range.

Appendix 18

The storage medium according to Appendix 16, further including, in the classifying of the obstruction that is detected, causing the autonomous moving body to move away from the wheelchair when the obstruction is classified as the wheelchair that a person is riding in.

Appendix 19

The storage medium according to Appendix 11, further including, in the classifying of the obstruction that is detected, enlarging the defense space and causing the autonomous moving body to move out of a space through which the stretcher passes in a direction in which the stretcher advances when the obstruction is classified as a stretcher, in the changing of the range of the defense space to the first range and in the changing the range of the defense space from the first range to the second range.

Appendix 20

The storage medium according to Appendix 11, further including storing map information of the facility space through which the autonomous moving body moves, wherein, in the classifying of the obstruction that is detected, the function causes a computer to execute classifying the obstruction, based on the map information.

Appendix 21

The autonomous moving method according to Appendix 1, wherein a range in which obstructions are detectable by the first detecting unit in the vicinity of the autonomous moving body is a range that is wider than the defense space.

Appendix 22

The autonomous moving method according to Appendix 1, wherein the facility space through which the autonomous moving body moves is inside a hospital, a business office, a factory, a warehouse, or a commercial facility.

Appendix 23

The storage medium according to Appendix 11, wherein a range in which obstructions are detectable by the first detecting unit in the vicinity of the autonomous moving body is a range that is wider than the defense space.

Appendix 24

The storage medium according to Appendix 11, wherein the facility space through which the autonomous moving body moves is inside a hospital, a business office, a factory, a warehouse, or a commercial facility.

What is claimed is:

1. An autonomous moving system including an autonomous moving body that moves autonomously, the autonomous moving system comprising:
   a CPU
   wherein the CPU is configured to execute a first program to control movement of the autonomous moving body, including collision control of at least one of control to avoid a collision of the autonomous moving body and control to mitigate damage upon a collision;
   the CPU is configured to execute a second program to set a predetermined defense space around the autonomous moving body, for executing the collision control by the CPU; and
   the CPU is configured to execute a third program to classify an obstruction detected by a first detecting unit that is installed in the autonomous moving body and that detects obstructions in a vicinity of the autonomous moving body, and the obstruction is also detected by a second detecting unit, the second detecting unit being installed in a facility space through which the autonomous moving body moves and that detects obstructions in the vicinity of the autonomous moving body, wherein
   the second program changes a range of the predetermined defense space to a first range based on a result of the third program classifying the obstruction detected by one of the first detecting unit and the second detecting unit,
   the second program changes the range of the predetermined defense space from the first range to a second range based on a result of the third program classifying the obstruction detected by at least another of the first detecting unit and the second detecting unit,
   the CPU is configured to execute control of movement of the autonomous moving body including the collision control in at least one of when the obstruction is inside the predetermined defense space and when the obstruction is predicted to enter inside the predetermined defense space, and
   when the third program classifies the obstruction as a wheelchair, the second program reduces a width of the predetermined defense space on a wheelchair side, and increases the width of the predetermined defense space on an opposite side from the wheelchair.

2. The autonomous moving system according to claim 1, wherein
   the movement of the autonomous moving body includes the autonomous moving body starting to move, and
   the CPU is configured to stop the autonomous moving body from starting to move, based on the obstruction classified by the the third program.

3. The autonomous moving system according to claim 1, wherein the CPU is configured to stop movement of the autonomous moving body when the obstruction is present in the first range and the second range.

4. The autonomous moving system according to claim 1, wherein the third program classifies the obstruction detected by the first detecting unit and the second detecting unit, by using an algorithm that is subjected to machine learning using the obstruction as training data.

5. The autonomous moving system according to claim 1, wherein, when the third program classifies the obstruction as a wall, the second program excludes a portion of the wall of the predetermined defense space from the predetermined defense space.

6. The autonomous moving system according to claim 1, wherein, when the third program classifies the obstruction as the wheelchair in a state of being stopped for a predetermined period of time, the second program excludes a portion of the wheelchair of the predetermined defense space from the predetermined defense space.

7. The autonomous moving system according to claim 1, wherein, when the third program classifies the obstruction as the wheelchair that a person is riding, the CPU causes the autonomous moving body to move away from the wheelchair.

8. The autonomous moving system according to claim 1, wherein
   when the third program classifies the obstruction as a stretcher, the second program enlarges the predetermined defense space, and
   when the third program classifies the obstruction as the stretcher, the CPU causes the autonomous moving body to move out of a space through which the stretcher passes, in a direction in which the stretcher advances.

9. The autonomous moving system according to claim 1, further comprising: a storage unit storing map information of the facility space through which the autonomous moving body moves, wherein the third program classifies the obstruction that is detected, based on the map information acquired from the storage unit.

10. The autonomous moving system according to claim 1, wherein the first detecting unit is configured to detect obstructions in the vicinity of the autonomous moving body in a range that is wider than the predetermined defense space.

11. The autonomous moving system according to claim 1, wherein the facility space through which the autonomous moving body moves is inside a hospital, a business office, a factory, a warehouse, or a commercial facility.

12. The autonomous moving system according to claim 1, wherein when reducing the width of the predetermined defense space on the wheelchair side, the width is reduced until the wheelchair is no longer in the predetermined defense space.

13. An autonomous moving method for an autonomous moving body that moves autonomously, the autonomous moving method comprising:

setting a predetermined defense space around the autonomous moving body, for executing collision control of at least one of control to avoid a collision between the autonomous moving body and an obstruction and control to mitigate damage upon a collision;

classifying an obstruction in a vicinity of the autonomous moving body that is detected by a first detecting unit installed in the autonomous moving body, and the obstruction in the vicinity of the autonomous moving body that is detected by a second detecting unit installed in a facility space through which the autonomous moving body moves;

changing a range of the predetermined defense space to a first range based on a result of classification of the obstruction, detected by one of the first detecting unit and the second detecting unit;

changing the range of the predetermined defense space from the first range to a second range based on a result of classifying the obstruction detected by at least another of the first detecting unit and the second detecting unit; and executing control of movement of the autonomous moving body including the collision control in at least one of when the obstruction is inside the predetermined defense space and when the obstruction is predicted to enter inside the predetermined defense space, wherein when classifying the obstruction as a wheelchair, a width of the predetermined defense space on a wheelchair side reduces, and increases the width of the predetermined defense space on an opposite side from the wheelchair.

14. A non-transitory storage medium storing instructions that are executable by one or more processors and that cause the one or more processors to perform functions comprising:

setting a predetermined defense space around an autonomous moving body, for executing collision control of at least one of control to avoid a collision between the autonomous moving body and an obstruction and control to mitigate damage upon a collision;

classifying an obstruction in a vicinity of the autonomous moving body that is detected by a first detecting unit installed in the autonomous moving body, and the obstruction in the vicinity of the autonomous moving body that is detected by a second detecting unit installed in a facility space through which the autonomous moving body moves;

changing a range of the predetermined defense space to a first range based on a result of classification of the obstruction, detected by one of the first detecting unit and the second detecting unit;

changing the range of the predetermined defense space from the first range to a second range based on a result of classifying the obstruction detected by at least another of the first detecting unit and the second detecting unit; and executing control of movement of the autonomous moving body including the collision control in at least one of when the obstruction is inside the predetermined defense space and when the obstruction is predicted to enter inside the predetermined defense space, wherein when classifying the obstruction as a wheelchair, a width of the predetermined defense space on a wheelchair side reduces, and increases the width of the predetermined defense space on an opposite side from the wheelchair.

* * * * *